United States Patent [19]

Yanagiuchi et al.

[11] Patent Number: 5,117,379
[45] Date of Patent: May 26, 1992

[54] DATA PROCESSING DEVICE FOR USE IN STATISTIC CALCULATION

[75] Inventors: Shigenobu Yanagiuchi, Tenri; Shoichi Kawai, Osaka; Yukihiro Omura, Yamatokoriyama; Yasuhiro Kotani, Nara; Kazuya Inoue, Yamatokoriyama, all of Japan

[73] Assignee: Sharp Kabushiki Kaisha, Osaka, Japan

[21] Appl. No.: 555,673

[22] Filed: Jul. 19, 1990

Related U.S. Application Data

[63] Continuation of Ser. No. 63,216, Jun. 17, 1987, abandoned.

[30] Foreign Application Priority Data

| Jun. 17, 1986 | [JP] | Japan | 61-142586 |
| Jun. 17, 1986 | [JP] | Japan | 61-142588 |
| Jul. 31, 1986 | [JP] | Japan | 61-181792 |
| Aug. 22, 1986 | [JP] | Japan | 61-197711 |
| Aug. 30, 1986 | [JP] | Japan | 61-204959 |

[51] Int. Cl.$^5$ .............................................. G06F 15/36
[52] U.S. Cl. .............................. 364/715.01; 364/224; 364/224.1; 364/231
[58] Field of Search ... 364/200 MS File, 900 MS File, 364/710.08, 710.1, 715.01

[56] References Cited

U.S. PATENT DOCUMENTS

| Re. 30,671 | 7/1981 | Poland | 364/200 |
| 3,610,902 | 10/1971 | Rahenkamp et al. | 364/200 |
| 4,012,725 | 3/1977 | Spangler et al. | 364/200 |
| 4,037,092 | 7/1977 | Osborne et al. | 364/706 |
| 4,178,633 | 12/1979 | Olander, Jr. et al. | 364/709 |
| 4,298,949 | 11/1981 | Poland | 364/706 |
| 4,321,688 | 3/1982 | Sado et al. | 364/900 |
| 4,476,541 | 10/1984 | Boone et al. | 364/900 |
| 4,507,743 | 3/1985 | Haneda et al. | 364/200 |
| 4,521,849 | 6/1985 | Wilder, Jr. | 364/200 |
| 4,547,860 | 10/1985 | Lapeyre | 364/900 |
| 4,597,045 | 6/1986 | Kiuchi | 364/900 |
| 4,608,638 | 8/1986 | Tsikos | 364/900 |
| 4,646,081 | 2/1987 | Tsunoda | 340/792 |

*Primary Examiner*—Michael R. Fleming
*Assistant Examiner*—Debra A. Chun

[57] ABSTRACT

A data processing device according to the present invention including memory device, input device, display device for repetitions processing of various kinds of statistic data in table form and having the capability of easily executing various kinds of statistic calculations.

7 Claims, 30 Drawing Sheets

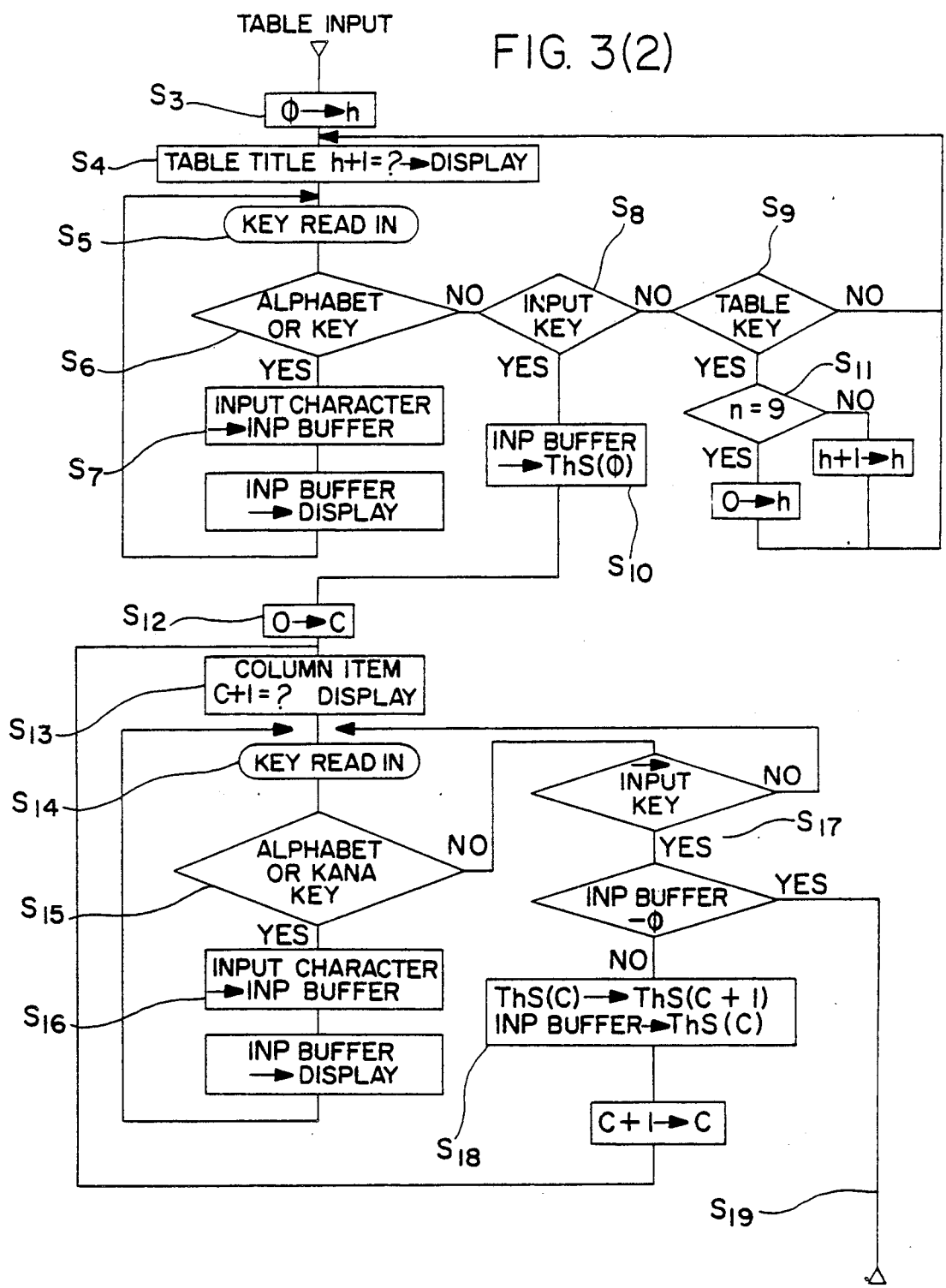

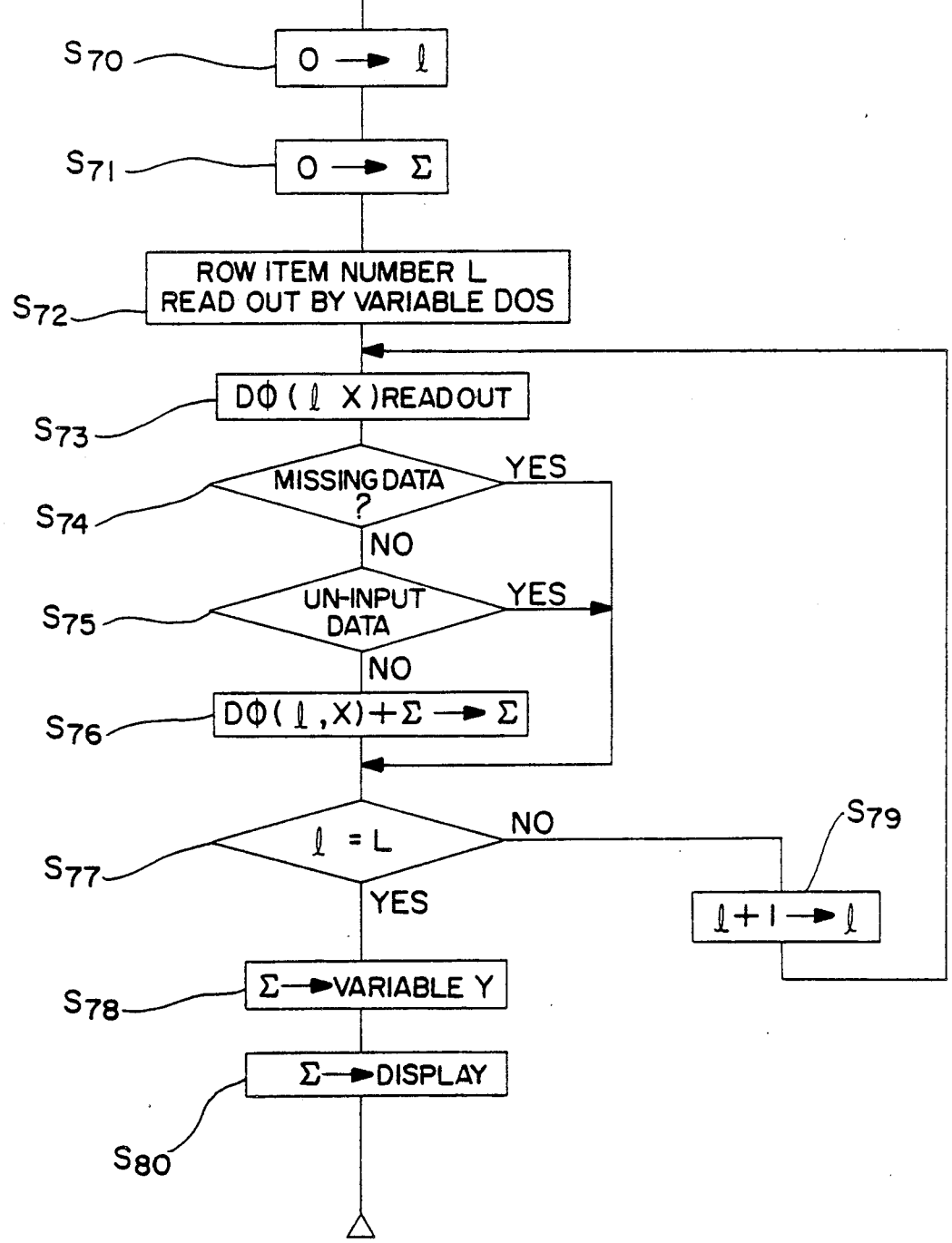

FIG. 8(A)

| T∅$ | ∅ | c | T∅$(∅)<br>"MATHEMATICS" | | T∅$(1)<br>"JAPANESE" | T∅$(2)<br>"SCIENCE" |
|---|---|---|---|---|---|---|
| T∅$(3)<br>"RECORD LIST" | D∅$ | ∅ | L | D∅$(∅)<br>"AOKI" | D∅$(1)<br>"KATO" |
| D∅$(2)<br>"SAITO" | D∅$(3)<br>"CHIBA" | | | D∅$(4)<br>"NUMATA" | D∅$(5)<br>"HAYASHI" |
| D∅$(6)<br>"YOKOI" | D∅ | m | n | D∅(∅,∅)<br>63 | D∅(∅,1)<br>82 |
| D∅(∅,2)<br>73 | D∅(1,∅)<br>49 | | | D∅(1,1)<br>35 | D∅(1,2)<br>94 |
| D∅(2,0)<br>75 | | | | ---- | |
| | | | | | |
| | | | | ---- | D∅(6,2)<br>74 |

FIG. 8(B)

TABLE TITLE

| RECORD LIST | | | |
|---|---|---|---|
| | MATHEMATICS | JAPANESE | SCIENCE |
| AOKI | 63 | 82 | 73 |
| KATO | 49 | 35 | 94 |
| SAITO | 75 | 63 | 83 |
| CHIBA | 93 | 46 | 63 |
| NUMATA | 24 | 35 | 42 |
| HAYASHI | 38 | 79 | 56 |
| YOKOI | 63 | 95 | 74 |

COLUMN ITEM

ROW ITEM

FIG. 9(A)

| T⌀$ ⌀ C | T⌀$(⌀) "MATHEMATICS" | T⌀$(1) "ENGLISH" | T⌀$(2) "SCIENCE" |
|---|---|---|---|
| T⌀$(3) "JAPANESE" | T⌀$(4) "RECORD LIST" | D⌀$ ⌀ L | D⌀S(⌀) "AOKI" |
| D⌀$(1) "KATO" | D⌀$(2) "SAITO" | —————— | —————— |
| D⌀ m n | D⌀(⌀,⌀) 30 | D⌀(⌀,1) 80 | D⌀(⌀,2) 45 |
| D⌀(⌀,3) 93 | D⌀(1,⌀) 85 | D⌀(1,1) 63 | D⌀(1,2) 47 |
| D⌀(1,3) 39 | D⌀(2,⌀) 37 | —————— | —————— |
| —————— | | D⌀(*l*,*l*) $9\,999999999 \times 10^{99}$ | |
| —————— | D⌀(*l*,g) $-9\,999999999 \times 10^{99}$ | —————— | —————— |
| | | | |

FIG. 9(B)

TABLE LIST → RECORD LIST
COLUMN ITEM ↓

| | MATHEMATICS | ENGLISH | SCIENCE | JAPANESE |
|---|---|---|---|---|
| AOKI | 30 | 80 | 45 | 93 |
| KATO | 85 | 63 | 47 | 39 |
| SAITO | 37 | 43 | 76 | 68 |
| TAKAI | 49 | 83 | 93 | 48 |
| YOKOTA | 34 | 2 | 47 | 39 |

ROW ITEM

FIG. 13

| DEGREE OF FREEDOM | LIMITATION | (A) APPROXIMATE | (B) RECURRENCE | (C) ROM |
|---|---|---|---|---|
| LARGE (MORE THAN 40) | PRECISION | ◯ | ◯ | ◯ |
| | CAPACITY | ◯ | ◯ | ✗ |
| | SPEED | ◯ | ✗ | ◯ |
| SMALL (LESS THAN 39) | PRECISION | ✗ | ◯ | ◯ |
| | CAPACITY | ◯ | ◯ | ✗ |
| | SPEED | ◯ | ✗ | ◯ |

FIG. 14

| n \ R | 1.0 ---------- | 0.05 | --------- | 0.01 | ------ 0.0 |
|---|---|---|---|---|---|
| 1 | | | | | |
| 2 | RECURRENCE | ROM | RECURRENCE | ROM | RECURRENCE |
| ⋮ | | | | | |
| 39 | | | | | |
| 40 ⋮ | APPROXIMATE | | | | |

| STEP | KEY OPERATION | DISPLAY |
|---|---|---|
| ($S_{11}$) | DISTRIBUTION FUNCTION t(P) | n = ? |
| ($S_{12}$) | 9 | n = 9_ |
| ($S_{13}$) | ENTER | P = ? |
| ($S_{14}$) | 0 . 0 1 | P = 0.01_ |
| ($S_{15}$) | ENTER | 2.821 |

FIG. 17

| BASIC FUN. | INPUT KEY | CONTENT OF DISTRIBUTION FUNCTION |
|---|---|---|
| PND(P) | DATA N(P) | IN NORMAL DISTRIBUTION, THE POINT CORRESPONDING TO THE UPSIDE PROVABILITY P IS OBTAINED |
| NDS(x) | DATA N(x) | IN NORMAL DISTRIBUTION, THE UPSIDE PROVABILITY IS OBTAINED FROM THE POINT X |
| PTD(n,p) | DATA t(p) | IN t-DISTRIBUTION OF n DEGREE OF FREEDOM, THE POINT CORRESPONDING TO THE UPSIDE PROVABILITY P IS OBTAINED |
| TDS(n,x) | DATA t(x) | IN t-DISTRIBUTION OF n DEGREE OF FREEDOM, THE UPSIDE PROVABILITY IS OBTAINED FROM THE POINT X |
| PXD(n,p) | DATA $x^2(p)$ | IN $x^2$-DISTRIBUTION OF n DEGREE OF FREEDOM, THE POINT CORRESPONDING TO THE UPSIDE PROVABILITY P IS OBTAINED |
| XDS(n,x) | DATA $x^2(x)$ | IN $x^2$-DISTRIBUTION OF n DEGREE OF FREEDOM, THE UPSIDE PROVABILITY IS OBTAINED FROM THE POINT X |
| PFD($n_1$,$n_2$,p) | DATA F(p) | IN F-DISTRIBUTION OF $n_1$, $n_2$ DEGREE OF FREEDOM, THE POINT CORRESPONDING TO THE UPSIDE PROVABILITY P IS OBTAINED |
| FDS($n_1$,$n_2$,x) | DATA F(x) | IN F-DISTRIBUTION OF $n_1$, $n_2$ DEGREE OF FREEDOM, THE UPSIDE PROVABILITY IS OBTAINED FROM THE POINT X |
| BDS(p,n,r) | DATA B | IN BINOMIAL DISTRIBUTION, THE PROVABILITY OF WHICH THE PHENOMENA OF THE PROVABILITY P OCCUR r TIMES OF n TIMES |
| PDS(m,x) | DATA P | IN POISSON'S DISTRIBUTION, THE PROVABILITY OF WHICH THE PHENOMENA OCCURRING m TIMES IN AVERAGE OCCUR X TIMES |

FIG. 20

| T∅$ | ∅ | =5 C | T∅$(∅) "MATHEMATICS" | T∅$(1) "ENGLISH" | T∅S(2) "SCIENCE" |
|---|---|---|---|---|---|
| T∅$(3) "JAPANESE" | | T∅$(4) " RECORD LIST " | D∅$ | ∅ L | D∅S(∅) " AOKI" |
| D∅$(1) " KATO" | | D∅$(2) "SAITO" | ———— | | ———— |
| D∅ | m | n | D∅(∅,∅) 30 | D∅(∅,1) 80 | D∅(∅,2) 45 |
| D∅(∅,3) 93 | | D∅(1,∅) 85 | D∅(1,1) 63 | D∅(1,2) 47 |
| D∅(1,3) 39 | | D∅(2,∅) 37 | ———— | | ———— |
| ———— | | ———— | | | ———— |
| ———— | | | | ———— | ———— |
| | | | | | |

DATA PROCESSING DEVICE FOR USE IN STATISTIC CALCULATION

This application is a continuation of application No. 07/063,216 filed on Jun. 17, 1987, now abandoned.

FIELD OF THE INVENTION

The present invention relates to a data processing device of a mini-computer, i.e., a pocket computer, with statistic processing functions.

DESCRIPTION OF THE PRIOR ART

Conventional mini-computers, so called pocket computers, are equipped with statistic processing capability but the statistic processing function has only been a single function.

To illustrate executing the statistic processing of data, reference is made to the following Table 1.

TABLE 1

| Item (sample) | Mathematics | Japanese | Science |
|---|---|---|---|
| Aoki | 63 | 82 | 73 |
| Kato | 49 | 35 | 94 |
| Suzuki | 75 | 63 | 83 |

In order to calculate the average value for Mathematics, the averaging process is executed on the condition of inputting the data (63, 49, 75) representing the Mathematics results. Similarly for calculating the average value for Japanese, the averaging process is executed on the condition of inputting the data (82, 35, 63).

Moreover, when calculating the total amount for Mathematics and Japanese, each data for results of Mathematics and Japanese is inputted so as to obtain the results. This operation has been very troublesome when various kinds of statistical calculations are executed in the above-mentioned statistic processing system.

More specifically, once each data of the results is inputted and the statistic calculation is executed, the confirmation, replacement and adding of the inputted data cannot be sequentially performed and when executing the above-mentioned operations, the data of each result must be re-inputted to execute the statistic calculation.

When the data processing is executed depending on the table format data, a problem exists in that input errors occur since the whole data cannot be seen collectively.

In a conventional mini-computer, calculation of a distribution function is executed by using a BASIC program having various kinds of approximate expressions and recurrence formulas as shown in "TOKEI-SUCHI-HYO (Statistics Values List)" published by Nippon Kikaku Kyokai (Japan Standard Association).

In executing the BASIC program, calculation of the distribution function has been executed by using the approximate expression. However, a portion of the approximate expression is not precise, the distribution calculation has been executed by using the recurrence formula in the poor precision portion.

In case of program calculation using a distribution list collecting the calculation values of the recurrence formulas, the distribution list is stored in the memory of the mini-computer and the necessary corresponding values of the calculations are called out one by one, whereby the program calculation is performed.

However, it takes much time in general to calculate the distribution function by using the recurrence formula and since a large memorizing capacity is needed to store the distribution list in memory, it is impossible to cover the whole distribution list.

Moreover, in the conventional mini-computer with statistical processing functions which form a data table of a matrix shape, the title and the names of the column items and the row items are inputted sequentially so that the desired table is made and the data is stored in a memory element such as random access memory (RAM) turns as shown in Table 1. However, when detecting the same data, the data must be re-inputted from each time the detection processing is executed making the process troublesome.

SUMMARY OF THE INVENTION

In consideration of the above-mentioned problems with conventional statistic processing systems, the primary object of the present invention is to provide a mini-computer with a statistic processing system having a memory for storing data in a table format formed with plural items of rows and columns, wherein various kinds of statistic calculations using the stored data are performed, and input confirmation, replacement and adding of inputted data can be done easily.

Another essential object of the present invention is to provide a statistic processing system which prevents the data input errors by displaying an incorrect data item or missing data item using specific symbols on the display unit.

Another essential object of the present invention is to provide a mini-computer with operating keys and a BASIC program, capable of performing distribution calculations in a short time on a large range of data with precision by using either an approximate expression or recurrence formula.

Another essential object of the present invention is to provide a data processing device by which sequential detection can be executed.

The statistic processing system according to the present invention includes a memory for storing each data in a table format formed of plural rows and columns (matrix), input means for inputting the data items by allocating the row, and/or the column of the table, indicating means for indicating the row or column of the data item stored in said memory, and calculation indicating keys for indicating plural kinds of statistic calculations, wherein the statistic calculation indicated by said calculation indicating keys is executed with respect to the row or column indicated by the indicating means.

The mini-computer according to the present invention further includes distribution function calculation indicating keys, numerical keys for inputting variables such as probability values and degrees of freedom, and a nonvolatile memory for memorizing a distribution function calculation routine using the distribution function calculation indicating keys.

The data processing device according to the present invention includes a memory means for memorizing data groups in a matrix, input means for inputting various data, a first memory portion for storing the input data received from the input means for comparison and a second memory portion for storing the data among the data for comparison, so that the comparison between the contents of the first and second memory portions can be executed sequentially.

According to the present invention, each data is stored in a table format made of plural rows and columns by allocating the row and/or column of the table format data into memory using the input means. Thereafter, the instructed calculation is executed with respect to the designated row or column and the kind of the statistic calculations to be performed. Therefore, various kinds of the statistic calculations such as a statistic process with one or more variables can be easily executed by designating the row or column and the kind of statistic calculation desired without re-inputting the data item many times. Confirmation and correction of the input data item can be also easily done by reading and writing the data item.

In the statistic processing system according to the present invention, where the data read out of an data item area is a specific data, a specific character is displayed in the display unit.

In a mini-computer according to the present invention, calculation of the distribution function is performed depending on the distribution function calculation routine stored in memory, use of the distribution function calculation indicating keys, and the input of variables such as probability values and degree of freedom.

In the data processing device according to the present invention, data groups are stored in a matrix in the memory means. Data inputted for comparison using the input means are stored in the first memory portion. Other data among said data group are stored in turn in the second memory portion for comparison with the inputted data. The comparison between the first and the second memory portions is sequentially executed so that the data among the data group and the data inputted through the input means can be continuously executed.

BRIEF DESCRIPTION OF THE DRAWINGS

FIGS. 3 to 7, 10, 15, 18, 21(A) to 21(D), 26, 27, are flow charts showing a statistic processing operation;

FIG. 8(A), 9(A), 20, 24 illustrate memory arrangements for storing data in a table format;

FIG. 8(B), 9(B) is a view showing data in a table format;

FIG. 13 is a view showing the method of performing a distribution function;

FIG. 14 is a view showing an example of the T-distribution calculation by using the mini-computer;

FIG. 16 is a view showing a calculation operation of the mini-computer;

FIG. 17 is a view showing a series of BASIC language commands corresponding to the distribution calculation keys; and, FIG. 25 is a view showing a display example using the display unit.

DETAILED DESCRIPTION OF THE PREFERRED EMBODIMENTS

Figure 1:
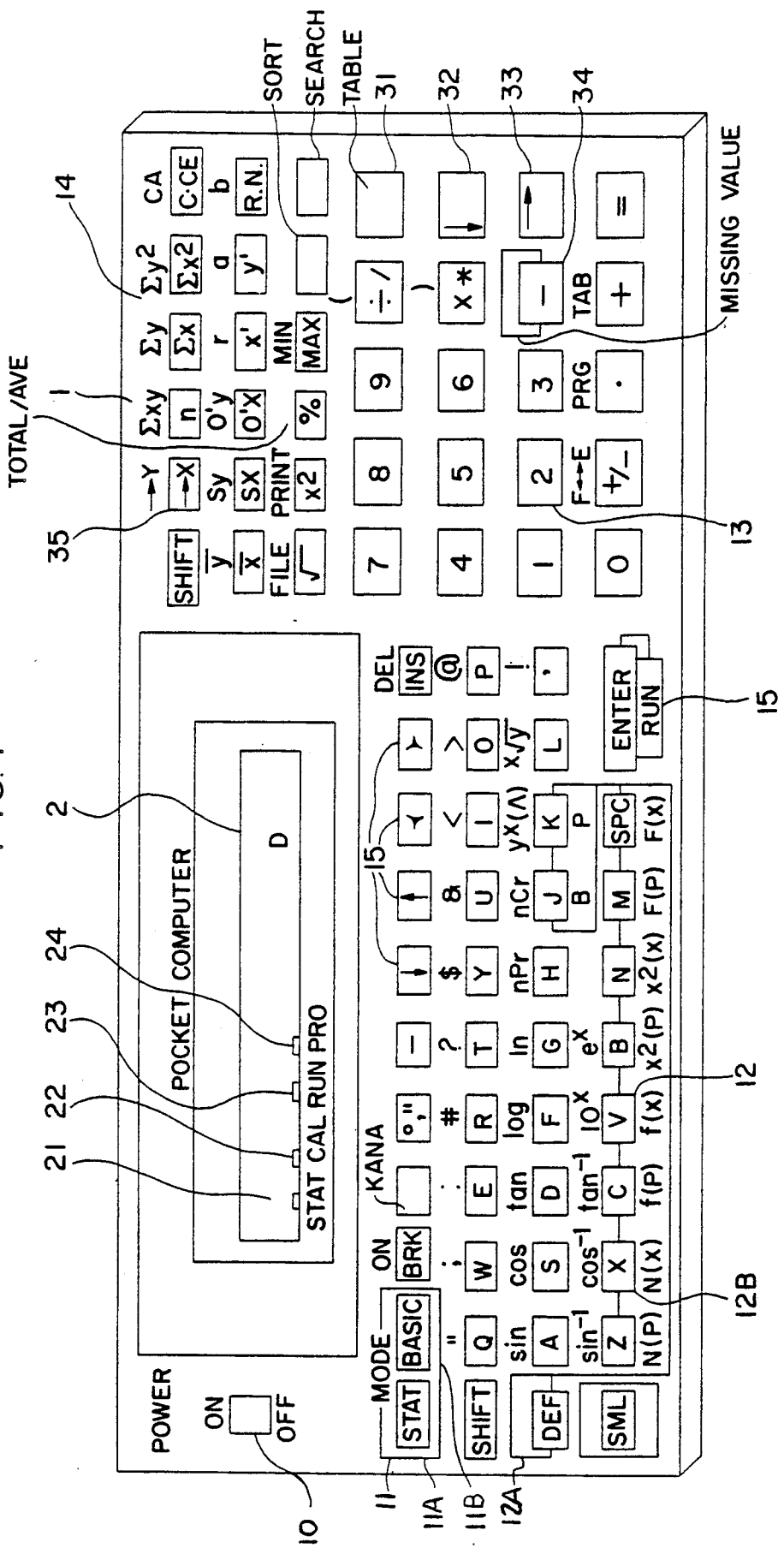
FIGS. 1, 11, 19, 22 are perspective views of mini-computers according to the present invention.

FIG. 1 is a schematic perspective view showing a mini-computer of a first and second preferred embodiments according to the present invention. There are provided a liquid- crystal display unit (hereinafter LCD) 2 in the left upper portion of the mini-computer (body) 1 with a keyboard including character input keys and function keys in the peripheral portion of the mini-computer body 1.

In the LCD 2 there is provided a dot segment type display with 24 units in one line and indicators 21, 22, 23 and 24 for indicating the mode condition of the mini-computer in the lower portion of the LCD 2.

Next, referring to the various kinds of keys, reference numeral 10 denotes a power switch for initializing the mini-computer. Upon the initialization of the mini-computer, the mode of the mini-computer is preset in the statistic processing mode (STAT).

Reference numeral 11 denotes mode setting keys comprising STAT key 11A for setting a statistic processing mode (STAT) and a calculation mode (CAL), and BASIC key 11B for setting a BASIC program running (RUN) mode for execution of a program in the BASIC language and a programming mode (PRO).

In the statistic processing STAT mode the indicator STAT 21 is on, in the CAL mode the indicator CAL 22 is on, in the RUN mode the indicator RUN 23 is on and in the PRO mode the indicator PRO 24 is on.

Reference numeral 12 denotes a group of character input keys which are defined for various kinds of opening keys. Particularly in the group of lower keys 12B there are disposed character keys which are defined as a group of distribution function keys used in statistic processing by operating the distribution function indicating keys 12A.

Reference numeral 13 denotes a group of numerical input keys and a group of calculation indicating keys Subtraction key 34 is defined as a missing value key which indicates the absence of the data item in the statistic processing by depressing the SHIFT key.

Reference numeral 14 denotes a group of function keys for executing various kinds of statistic processing such as calculation of the mean value, average value and deviation value for a designated row or column of data. Statistic calculation processing is executed by operating the above-mentioned function keys and the results of the calculations are outputted and applied to the LCD 2 and stored in a predetermined position of the table data area. Reference numeral 15 denotes cursor keys.

Reference numeral 31 denotes a table key for forming and reading out each table data for statistic processing. Reference numeral 32 denotes a row input ( ↓ input) down shift key for selecting each item in the row direction of the table. Reference numeral 33 denotes a column input (→ input) right shift key for selecting each item in the column direction of the table.

Reference numeral 35 denotes a statistic processing key (→ X) for inputting one variable or, when shifted, a statistic processing key (→Y), for inputting dual variables. Reference mark (→X) or (→Y) means that one or two column items are processed statistically.

Figure 2:
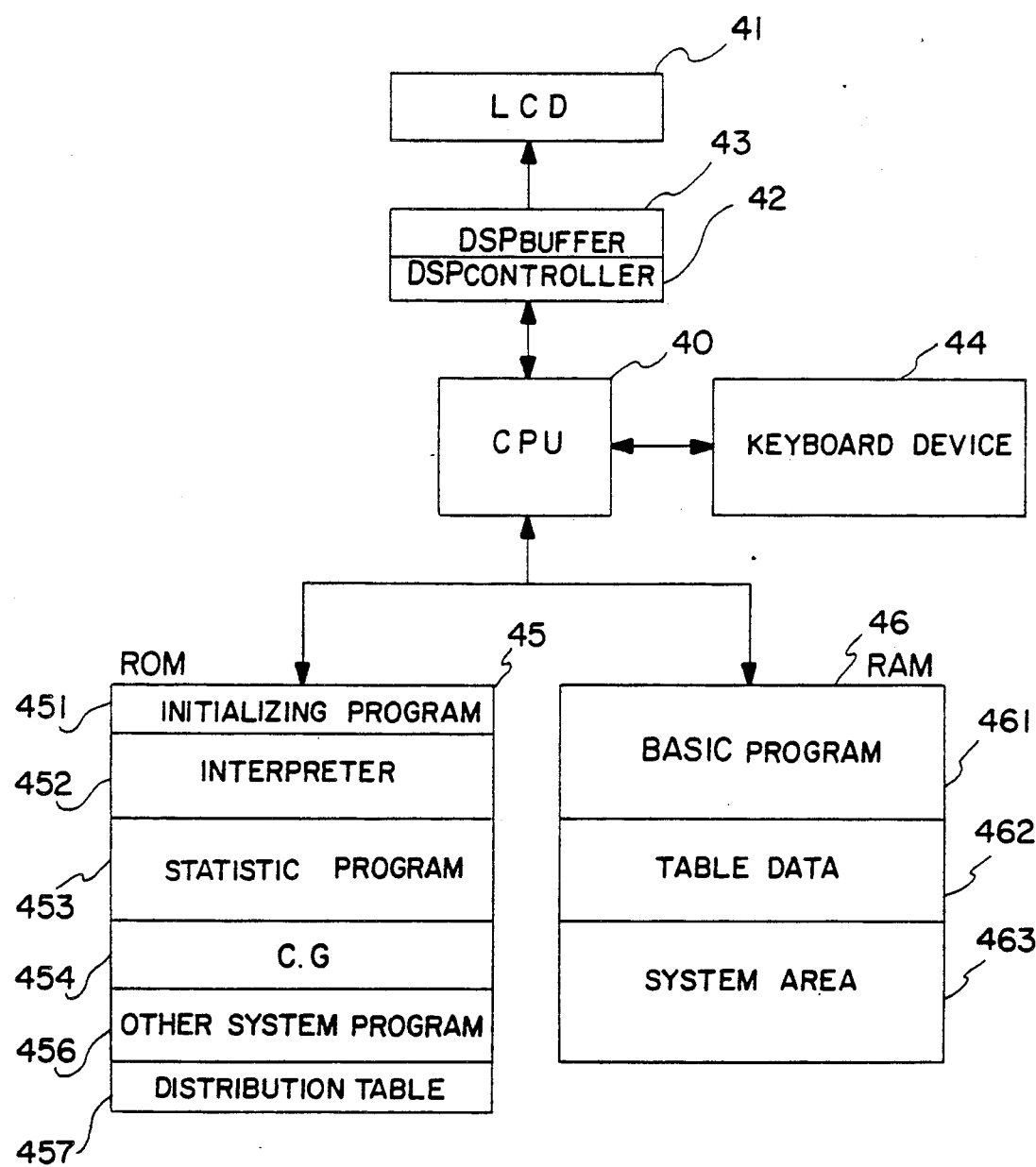
FIGS. 2, 12, 23 are circuit block diagrams showing the mini-computers of FIGS. 1, 11, 19, 22.

FIG. 2 is a block diagram showing a mini-computer of the first and second preferred embodiments according to the present invention.

Reference numeral 40 denotes a central processing unit (referred to as CPU) which executes the data processing functions depending on various kinds of control programs memorized in the read only memory (ROM) 45 connected to CPU 40 via a data bus line.

Reference numeral 41 denotes the aforementioned LCD 2 which is driven by the display control unit 42 connected to CPU 40. The display control unit 42 accommodates a display buffer 43 for storing display data (dot matrix data). Reference numeral 44 denotes the keyboard device shown in FIG. 1, which provides coded signals to the CPU 40.

ROM 45 comprises an initializing program area 451 for storing an initializing program that controls the initialization process at the time of applying power. The ROM 45 also includes an interpreter area 452 for the BASIC language; a statistic program area 453 for memorizing the statistic processing control program; and a character pattern generator (CG) 454 for developing code information for characters and symbols generated in the CPU 40 in a dot matrix pattern for output. The system program area 456 is provided for memorizing other various kinds of system programs. A distribution table area 457 is included for memorizing the calculation value on the basis of the predetermined condition of distribution functions such as normal distribution, T-distribution, $X^2$-distribution and F-distribution in a table format (each data in the distribution table is generally known as a distribution list). It is preferable that each of the above-mentioned areas 451 to 457 be individually defined as part of the ROM 45.

Reference numeral 46 denotes a random access memory (RAM) which is connected to CPU 40 through a data bus line as well as ROM 45. RAM 46 comprises a BASIC program area 461 for storing the user's BASIC language program. The RAM 46 includes a table data area 462 for storing plural table data which is obtained by the statistic processing system of the present invention, and a system area 463 used for allocating various kinds of buffers and counters. System area 463 includes an input buffer; h, C, L registers; and m, n, X counters. The table data area 462 contains variable data inputted in a BASIC format as shown in FIG. 8(A).

In FIG. 8(A), there are shown the memory contents for variables $T\phi$ \$, $D\phi$ \$, $D\phi$ (m,n) which are used for the input of the BASIC program and statistic data among the variable data. The head variable $T\phi$ \$ represents the name of the variable and the variable C represents the number of the column item. Subsequently the column items $T\phi$() ... $T\phi$ \$(c) are stored (in this case c=3). Succeedingly, the variable $D\phi$ \$ represents the name of the row in which the item is stored. Furthermore, the data corresponding to each row and column is stored using the variable $D\phi$. The reference marks m and n represent the column and row of the table or the numbers in the lateral and vertical directions of the two dimensional arrangement. The data is respectively stored as the variables $D\phi$ ($\phi$, $\phi$) ... $D\phi$ (m,n) (in this case m=6, n=2).

As shown in the memory map of FIG. 8(A), the variables $T\phi$\$, $D\phi$\$, $D\phi$ (m,n) of the one dimensional and two dimensional arrangements can be used in the BASIC program. The table data inputted to be used in the statistic processing are stored in common with the BASIC program. In the present embodiment, the value range to be stored in the BASIC variable area is as follows:

$$-9.999999999 \times 10^{99} \leq 9.999999999 \times 10^{99}$$

The value $9.999999999 \times 10^{99}$ is defined as a missing value, and the value $-9.999999999 \times 10^{99}$ is defined as an un-input data.

Furthermore referring to the above-mentioned missing value and un-input data, a method has been adopted for memorizing special codes as a general data processing device in case the data is absent. However, it is necessary to discriminate whether the data is a missing value or an un-input data in the statistic process. Therefore, if a special code is allocated with respect to the missing value or un-input data, it is necessary to arrange the specific code to prevent it from being used together with the other character files at the time of BASIC processing since the statistic process and the BASIC process are performed in common in the present device.

Therefore, in a statistic processing system according to the present invention, the maximum and minimum values, are allocated to the missing and un-input data, respectively. The minimum value is discriminated by a minus sign.

The above-mentioned data item is set to a fixed length such as 16 bytes and the data 50, 53, 55 of the variable name and item name are stored in the header of the item name.

The address position 53 for storing the next variable name is obtained by the item number as described in Japanese Laid Open Patent No. 43246/1982.

Thus, since the variable data used in the BASIC program computation is also used together with the data table in statistic processing, the position of the variable data can be accessed by BASIC.

For example, the items 50, 51, 53 are allocated in the T \$($\phi$), T$\phi$ (1), T$\phi$ \$ (2) by the BASIC command, and "mathematics" data is stored by inputting T$\phi$ \$ ($\phi$)=mathematics. When the variable name of T$\phi$ \$ ($\phi$) is indicated, the variable data area of the RAM, i.e., the table data storing area, is searched to access the corresponding address. Reference numeral 52 denotes a table title item. For reference, the table data shown in FIG. 8(A) represents the table data examples in FIG. 8 (B).

Statistic calculation processing is executed on the basis of the table data by operating any key of the function key group 14 and the calculation result as well as the variable name is allocated as a new data item in the data table area. Therefore, in executing the BASIC program, the variable name can be indicated to be used.

As mentioned above, the table data formed by the statistic processing can be used on the BASIC program and the table data formed by the BASIC program can be used in the statistic processing.

Moreover, plural table data can be formed in series in the data table area. When the data table is formed in any statistic process, though the explanation is omitted, the data table is allocated in RAM whenever indicating the row and the column as shown in FIG. 8(A).

Next, the operations and actions of the present embodiment will be explained with reference to the flow charts shown in FIGS. 3(1) to 7.

Figure 3:
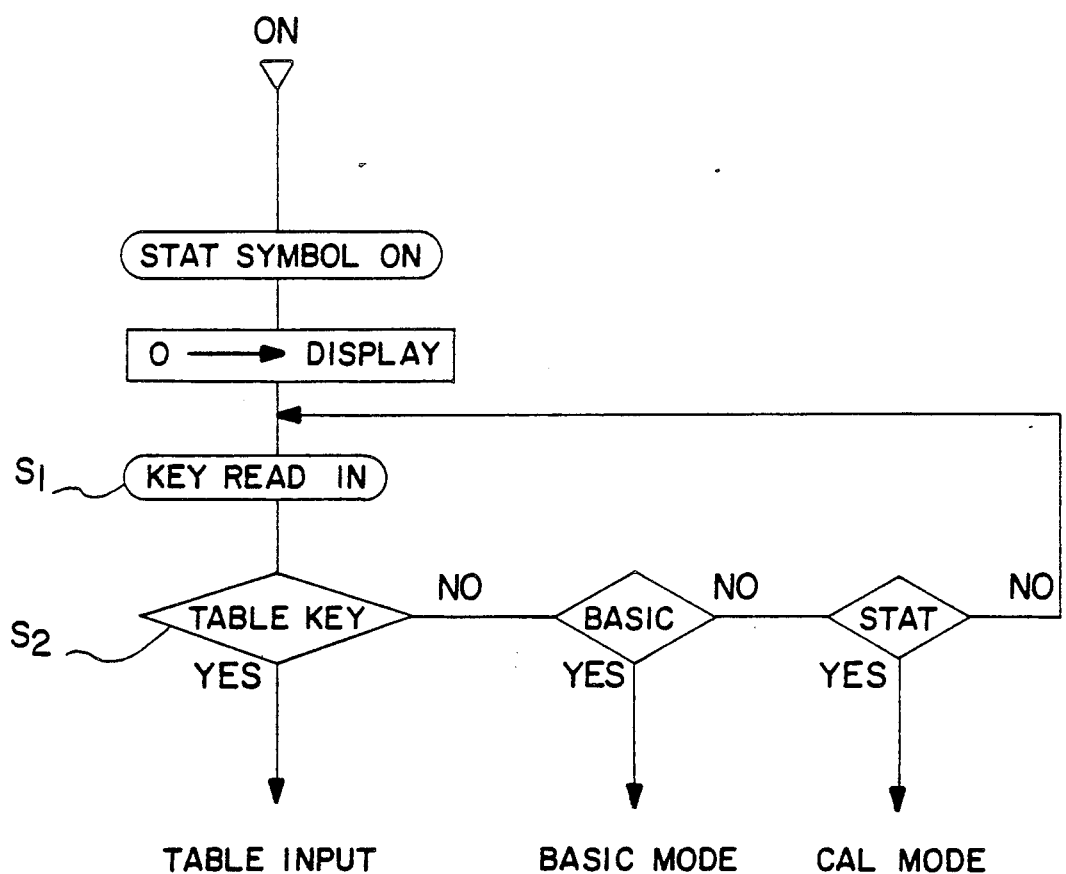

First, the initializing program is powered up by turning on the power switch 10 of the mini-computer body 1 and the process shown in FIG. 3 (1) is executed (assuming that the table data is not formed under this condition). After the above-mentioned process, the statistic processing mode is automatically set and the STAT symbol 21 is turned on. The STAT symbol 21 is lighted by providing the STAT symbol lighting data from CPU 1 to the display buffer 43. Other symbols are turned on in a similar way.

Once the table key 31 is operated in order to form a table under this condition, the statistic processing control program is started and the operation continues to the steps shown in FIG. 3(2).

When the BASIC key 11B is operated, the process goes to the step of forming or performing the BASIC program. Furthermore, when the STAT key 11B is operated, the calculation mode is set and the program goes to the step of the calculation process.

The process of operating the table key 31 and forming the table shown in FIG. 8(B) is explained below.

As shown in FIG. 3 (2), upon actuation of the table key 31, the h register for storing the table number is reset to be $\phi$ in step S3. Next in the step S4, the table title and then the data "The contents of the h register+1=?" are transmitted to the display controller 42 so that "The table title 1=?" is displayed.

That is, in step S3 the head position of the table data (the portion 50 in FIG. 8(A)) is indicated and it is judged whether the variable name is present or not. In case the data of the variable name data is present, the last item area of the column item (obtained by the item number C) is accessed. In this item area the table title of the first table is stored and the data of the first table title is taken out and provided to the display LCD 41 and the display is changed to "?" and then the table title such as "RECORD LIST" is displayed.

In case the data of the variable name is absent, when the data of the variable name is inputted, the key data is read in the step S5 and the kind of key is classified whether the key is an alphabet key or a kana key in the step S6. In the next step S7 the inputted character is stored in an input buffer and is transmitted to the display controller 42, whereby the table title is displayed in the display LCD 2. For example, when "RECORD LIST" is inputted by operating the key, "TABLE TITLE =RECORD LIST" is displayed.

Under this condition, when the input key 33 is depressed, the type of key is judged in step S8 and the inputted table title is stored in the variable data, Th$ ($\phi$). In this case the table title of h=$\phi$ (see FIG. 8(B)) is indicated and is stored in the variable data, Th$($\phi$). When the table key 31 is typed in succession with the input key S9, the contents of the h register is retrieved so that the next table number is selected in step S11.

After the input of the table title is completed, the input of the column item is performed. In step S12 the column item counter C is cleared and in the next step S13 "Column Item 1=?" is displayed.

Then it is judged whether the column item name is present or not. When the column item name is present, "Column Item 1=?" is displayed as well as the table title.

In case the column item name is absent, the item name of column item 1 is inputted and displayed in the steps S14, S15 and S16, wherein when "mathematics" is inputted, "Column Item 1=mathematics" is displayed.

Moreover, in case the input (→)key is pushed, the input key is judged in the step S17, and the name of the table title is transferred from the variable data T$\phi$ $($\phi$) to T$\phi$ $(1)$ and the item name of the column item 1 is stored in the variable data T$\phi$ $($\phi$). Successively, the name of the column item is inputted, in other words, the display is changed as shown by "Column Item 2=?". Furthermore, in case "Japanese" is inputted and next "Science" is inputted, the second and third column items are set and the next display "Column Item 4=?" is executed.

In this condition, when the input key 33 is typed, it is judged in the step S17 whether the character input is present, if so, the program goes to the step S19 (in FIG. 4) whereby the setting of the column item is completed and the program goes to the step of waiting for input of the first row item.

Figure 4:
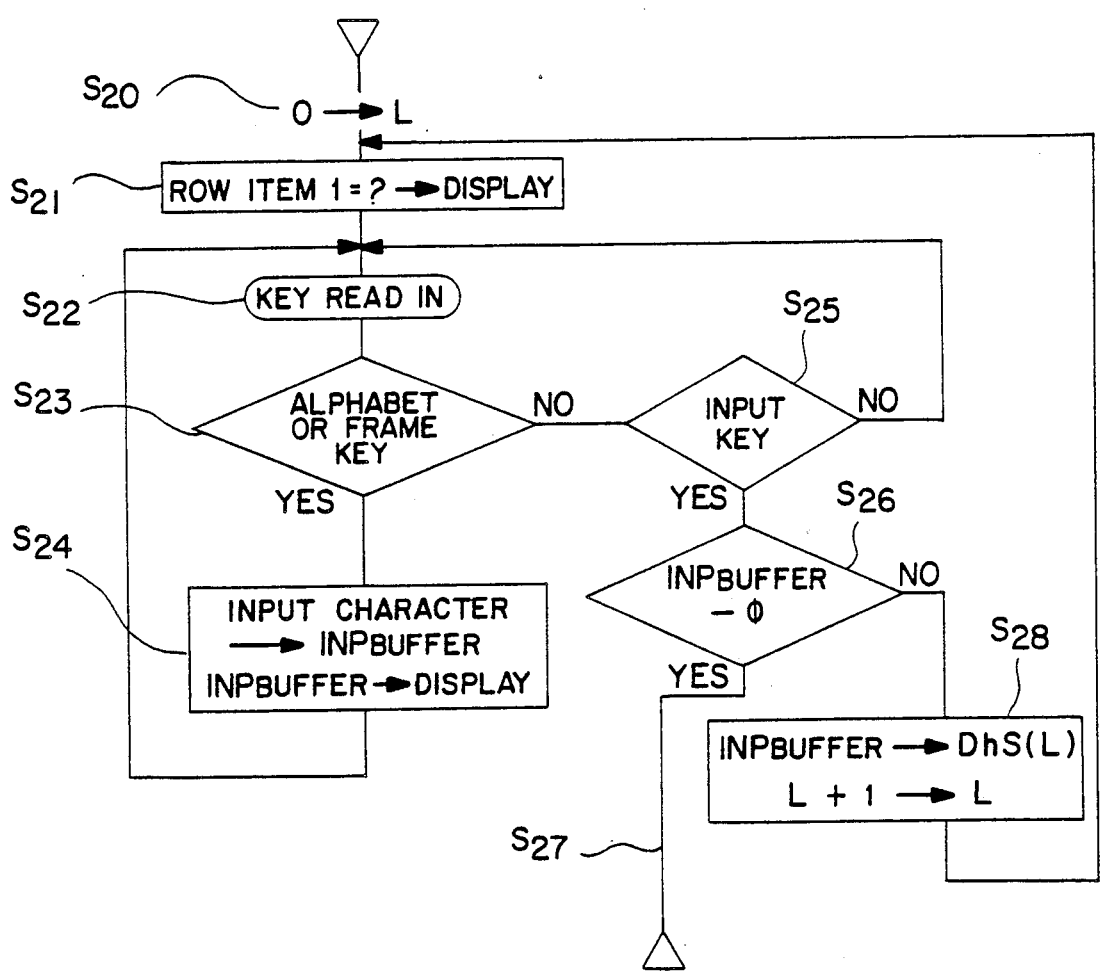

The input of the first row item is executed as shown by the flow chart in FIG. 4 and in the step S20 the L register for storing the row item number is cleared and "row item 1=?" is displayed in step S21.

Then it is judged whether the row item name is present or not. In case the row item name is present, the row item name is displayed as well as the table title and the column item.

In case the data of the row item name is absent, when the data of the row item name "Aoki" is inputted, the display "Row item 1=Aoki" is performed in the steps S22, S23 and S24.

In this condition, the row input key 32 is typed, the item name "Aoki" of the row item 1 is stored in the variable area D0$ ($\phi$) of BASIC in steps S26 and S28 and the program returns to step S21 and "Row item 2=?" is displayed and the program goes to the process of waiting for input of the second item.

Subsequently the row items Kato, Saito, Hayashi and Yokoi are ↓ inputted by row in turn and after finishing the above-mentioned input, "Row item 8=?" is displayed.

Figure 5:
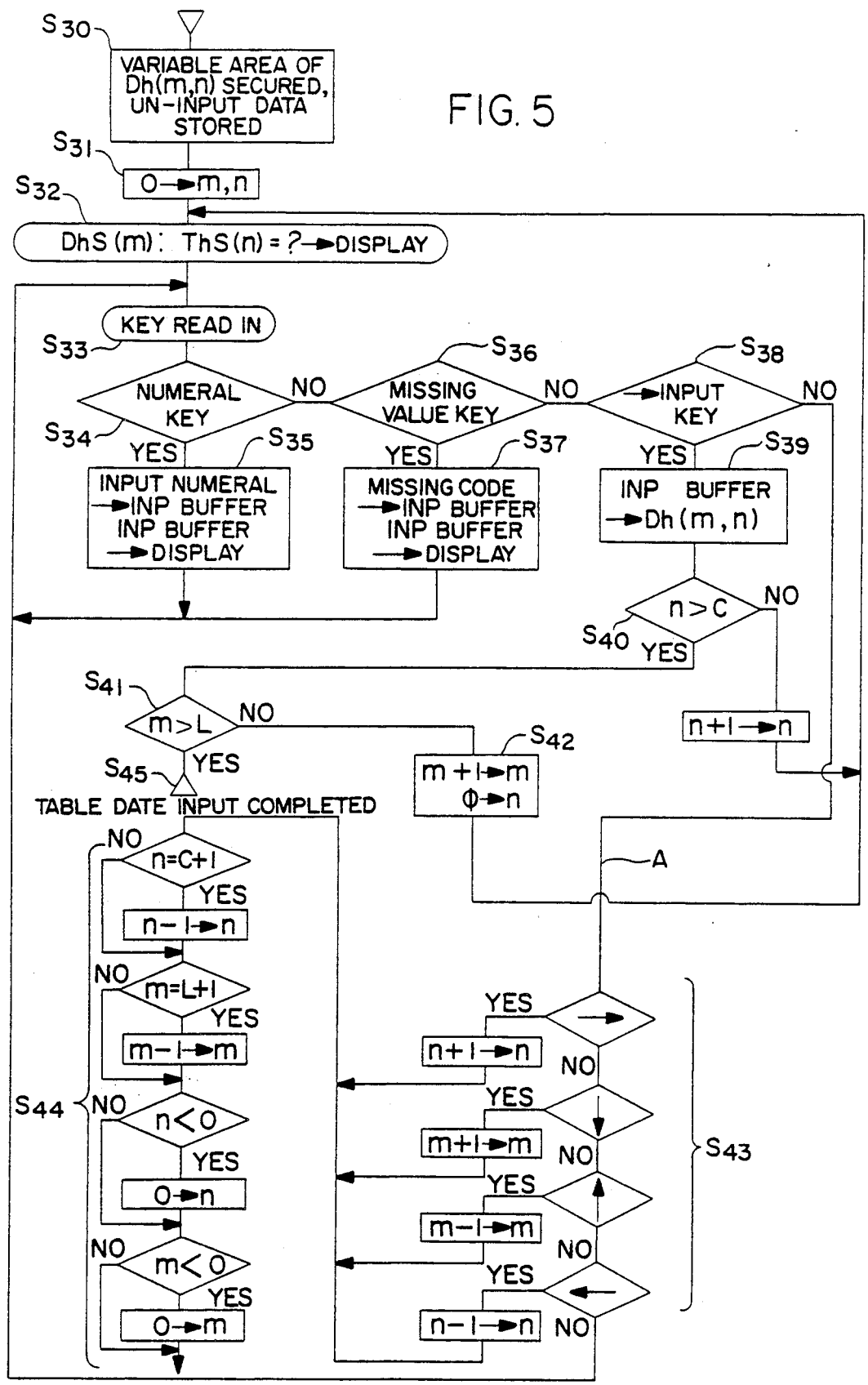

In case the row ↓ input is typed once more, the program goes to the flow chart in FIG. 5 from step S27 in FIG. 4 and the input of the data is executed.

Referring to the above-mentioned input of data as shown in FIG. 5, the variable area of Dh (m, n) is secured in memory by the column item number and row item number and the un-input data is respectively stored in the step 30. Subsequently in step S31 the values m, n showing the column and row items are cleared and in the next step S32 the display of "Aoki:mathematics=?" is performed. This means that input of the data in the portion of the first column and the first row in FIG. 8(B) is demanded.

When the data "63" is inputted by the key 13, the values inputted in steps S33, S34 and S35 are inputted in the input buffer and are displayed in the display LCD 2.

Furthermore, when the column input key 33 is operated, the mathematics record data "63" corresponding to Aoki is stored in the variable area D$\phi$, ($\phi$, $\phi$) of BASIC in the steps S38 and S39.

Subsequently in the step S40, it is judged whether or not the column item number n is over the value C. In case the number n is not over the value C, the column counter value n is increased by 1 so that the input of data corresponding to the next column becomes possible. In case the number n is over the value C, the program goes to the step S41 and it is judged whether or not the row item number m is over the value L. In case the number m is not over the value L, the column counter value is set to $\phi$ in the step S42 and the row counter value is increased by 1 and the program goes to the process of inputting data in the next row.

Thereby, the data 82, 73, 49, . . . , 74 are inputted by operating the column input key 33 and the contents as shown in FIG. 8(B) are stored in the variable data area of BASIC.

Additionally, in case the missing value key is pushed when inputting the data in the process shown in FIG. 5, the above-mentioned missing value is stored as the data in the indicated variable area in steps S36 and S37.

In step S43, when each of the cursor movement keys 15→, ↓, ↑, ← is pushed, the cursor is moved to the indicated adjacent cell and the contents of the cell indicated by the cursor is displayed in LCD 2 without rewriting the indicated variable data.

When the cursor reaches the right or left end or the top or bottom end of the data table, the movement of the cursor is stopped. Control of the movement of the cursor is executed in the step S44.

Thus, after the cursor is moved to any cell by operating the cursor keys 15, the data is newly inputted, whereby the data can be deleted or changed.

Figure 6:
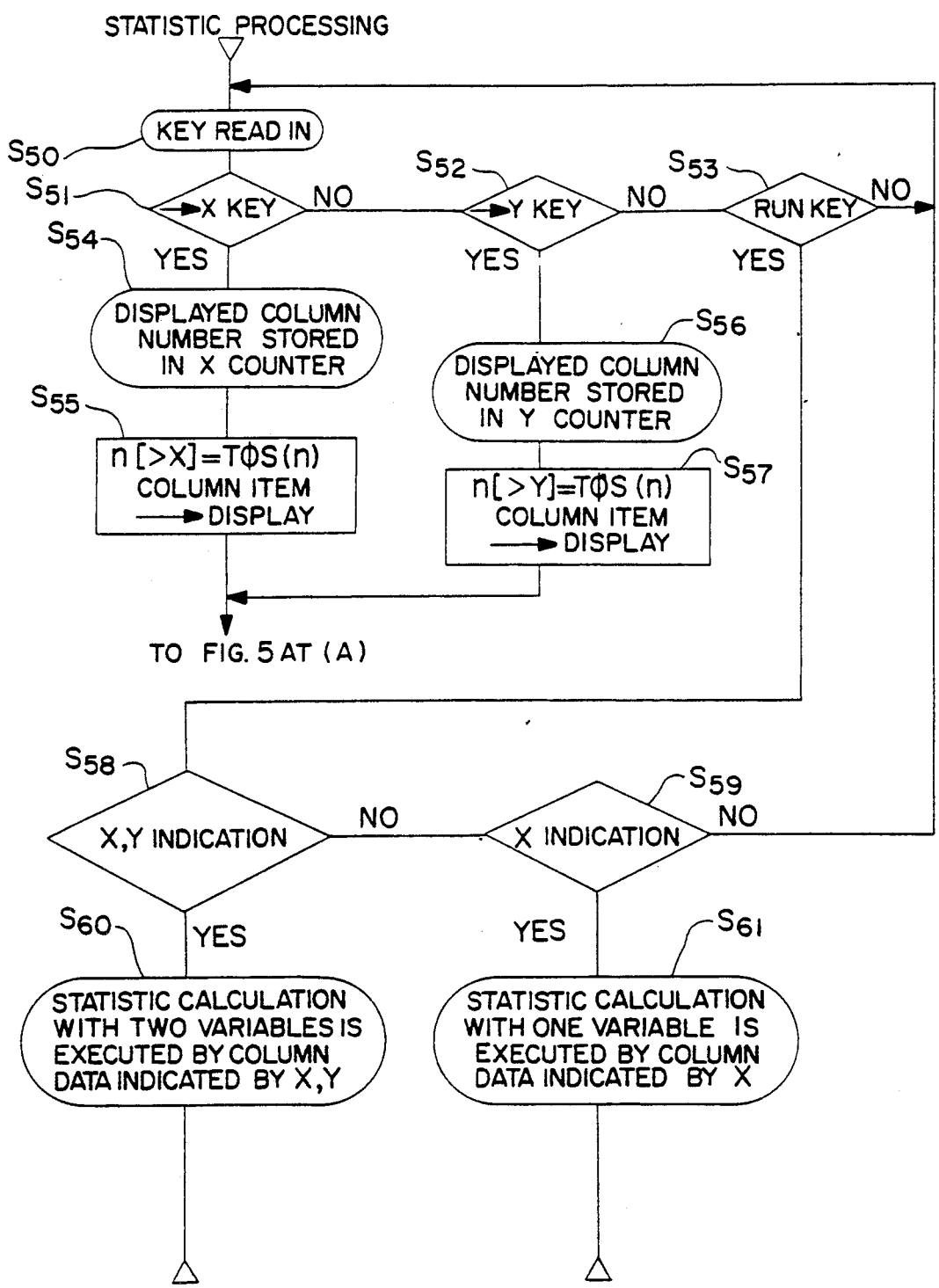

After input of the data table is completed in the step S45 in FIG. 5, the program goes to the statistic process in FIG. 6.

Referring to the statistic process shown in FIG. 6, the key input is read in the step S50 and in case it is judged in the step S51 that the → X key 35 has been pushed, the displayed column number is stored in the X counter in the step S54 and the display is performed in the step S55.

In case the cursor is indicated at the column item 1 in the table, the display of "Column Item 1 [>X]=mathematics" is performed.

The Y column (the second column) is indicated in the steps S52, S56 and S57 in the same way as the X column (the first column).

Subsequently in the step S53 the execution key is judged and in the step S58 it is judged whether both X and Y columns are indicated or not and in the step S59 it is judged whether the single X column is indicated or not. When both X and Y columns are indicated, the statistic calculation with two variables is executed by using the column data indicated by X and Y in the step S60.

In case of the single X column indication, the statistic calculation with one variable is executed by using the column data indicated by X in the step S61.

The statistic amounts are obtained by the abovementioned statistic calculation with two variables.

1. n, $\Sigma x^2$, Sx, $\sigma X$: same as the statistic calculation with one variable.
2. $\Sigma$ y: the amount of sample (y).
3. $\Sigma yz$: the amount of the square of the sample (y).
4. $\Sigma xy$: the amount of the product of the sample (x,y).
5. $\bar{y}$ y: the average $$\bar{y} = \frac{\Sigma y}{n}$$

of the sample (y).

6. Sy: assuming the parameter to be (n−1), the standard deviation $$Sy = \sqrt{\frac{\Sigma y^2 - n\bar{y}^2}{n - 1}}$$

which is obtained by the sample (y).

7. cy: assuming the parameter to be (n), the standard deviation $$cy = \sqrt{\frac{\Sigma y^2 - n\bar{y}^2}{n}}$$

which is obtained by the sample (y).

8. $\propto$ L the coefficient $a = y - bx$ of one dimensional regression curve $y = a + bx$.
9. b: the coefficient $$b = \frac{Sxy}{Sxx}$$

of one dimensional regression curve $y = a + bx$.

10. r: the relative coefficient $$r = \frac{Sxy}{Sxx \cdot Syy}$$

11. x': the estimate (the value x is estimated by the value y)

$$x' = \frac{y - a}{b}$$

12. y' the estimate (the value y is estimated by the value x)

$$y' = a + bx$$

$$Sxx = \Sigma x^2 - \frac{(\Sigma x)^2}{n}$$

$$Syy = \Sigma y^2 - \frac{(\Sigma y)^2}{n}$$

$$Sxy = \Sigma xy - \frac{\Sigma x \cdot \Sigma y}{n}$$

The statistic amounts are obtained by the statistic calculation with one variable as follows.

1. n: the number of the sample x.
2. $\Sigma$ x: the amount of the sample x.
3. $\Sigma$ $x^2$: z the amount of the square of the sample x.
4. x: the average $$x = \frac{\Sigma x}{n}$$

of the sample x.

5. Sx: assuming the parameter to be (n−1), the standard deviation $$Sx = \sqrt{\frac{\Sigma x^2 - n\bar{x}^2}{n - 1}}$$

which is used when the standard deviation of the population is estimated from the sample data taken out of the population.

6. $\sigma X$: assuming the parameter to the (n), the standard deviation $$\sigma x = \sqrt{\frac{\Sigma x^2 - n\bar{x}^2}{n}}$$

which is used in case all of the population are used as sample data or in case the standard deviation is calculated considering the sample to be the population.

In the above-mentioned statistic calculations, in case the indicated data is the missing value or the un-input data mentioned above, the data is excluded from the sample data and then the statistic processing calculation is executed. Thus, the missing value is inputted in the table data, whereby the processing of missing data becomes possible in the statistic processing calculation.

As described above, in the statistic processing system according to the present invention, since the plural kinds of data table are stored in the table data area and each data item is stored in an area by the above-mentioned process of forming tables as shown in FIG. 8, any kind of statistic processing can be executed. The statistic processing with one variable is executed by selecting any of the column item groups such as "mathematics" and operating any of the statistic processing keys group 14 as shown in FIG. 1.

The statistic processing with two variables is executed by selecting any two column items much as "mathematics", "language" shown in FIG. 8 (B) and inputting the data item into the X, Y registers respectively and by operating any of the statistic processing keys group 14 shown in FIG. 1. Since each data item is erased at the end of each calculation in conventional mini-computers with statistic functions, various kinds of the statistic processing cannot be executed and the data must be inputted each time the statistic processing calculations are performed. However, in the statistic processing system according to the present invention, when the selected and read out data are missing values or an un-input data, the data is excluded and processed, for example, and not included in the sample data and processed.

The processing of sample amount $\Sigma x$ is shown in FIG. 7 as an example. First, the count value 1 showing the row number and the amount register value $\Sigma$ are cleared in the steps S70 and S71. Next, the variable name (for example D$\phi$\$) is selected so as to read out the row item number "L" which was stored in the L register in the step S72. Subsequently, the column data item is selected by operating the $\rightarrow$X key 35 and it is judged whether the data is the missing data or un-input data in the steps S73 and S75, respectufuly.

If the data item is the maximum ($9.999999999 \times 10^{99}$), it is judged whether the data item is the missing data and if the data item is the minimum ($-9.999999999 \times 10^{99}$), it is judged whether the data item is the un-input data.

Where the data item is either the missing data or the un-input data, the program goes to step S77 and the next row data item is selected, or in other words, excluded from the statistic processing calculation. In case the data item is neither the missing data nor the un-input data, the program goes to the step S76 and the data item is added to the value of the $\Sigma$ register.

The calculation is executed until the row counter value "1" finally reaches the row item number "L", in other words, to the last row item number. Once the calculation is completed, the variable Y is allocated and stored in the table area in FIG. 8. At this time the data contained in the $\Sigma$ register is displayed.

As described above, in the statistic processing system of the mini-computer according to the present invention, including a memory for storing each data in the table form made by plural row and column items, each data is stored in a table format in memory by an input means. Subsequently any row or column of each of the data items stored in the memory and the kind of the statistic calculation are only indicated, whereby the indicated statistic calculation is executed for the indicated row and column. Since each data in the table format is stored in the memory, various kinds of statistic processing calculations can be easily executed by indicating only the row or the column of the data and the kind of statistic calculation such as a statistic processing with one variable or a statistic processing with two variables. Moreover, the confirmation, partial correction and addition of the inputted data item can be easily performed by reading in and writing to the memory, so that the statistic processing is facilitated.

A second preferred embodiment of the present invention is explained with reference to FIGS. 1, 2, 3, 9 and 10.

Figure 10B:
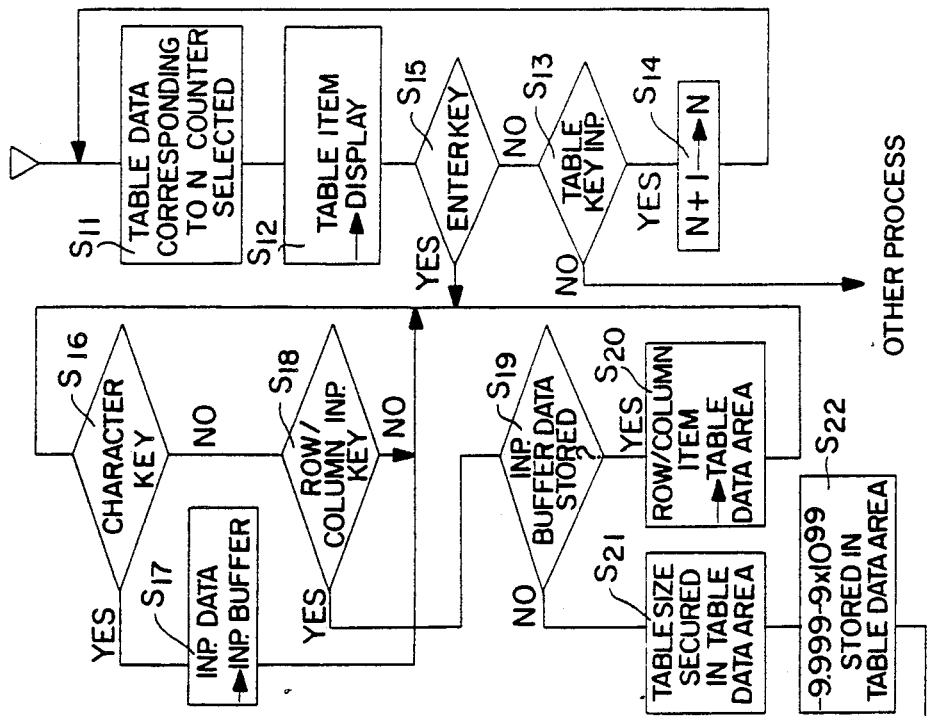
Figure 10A:
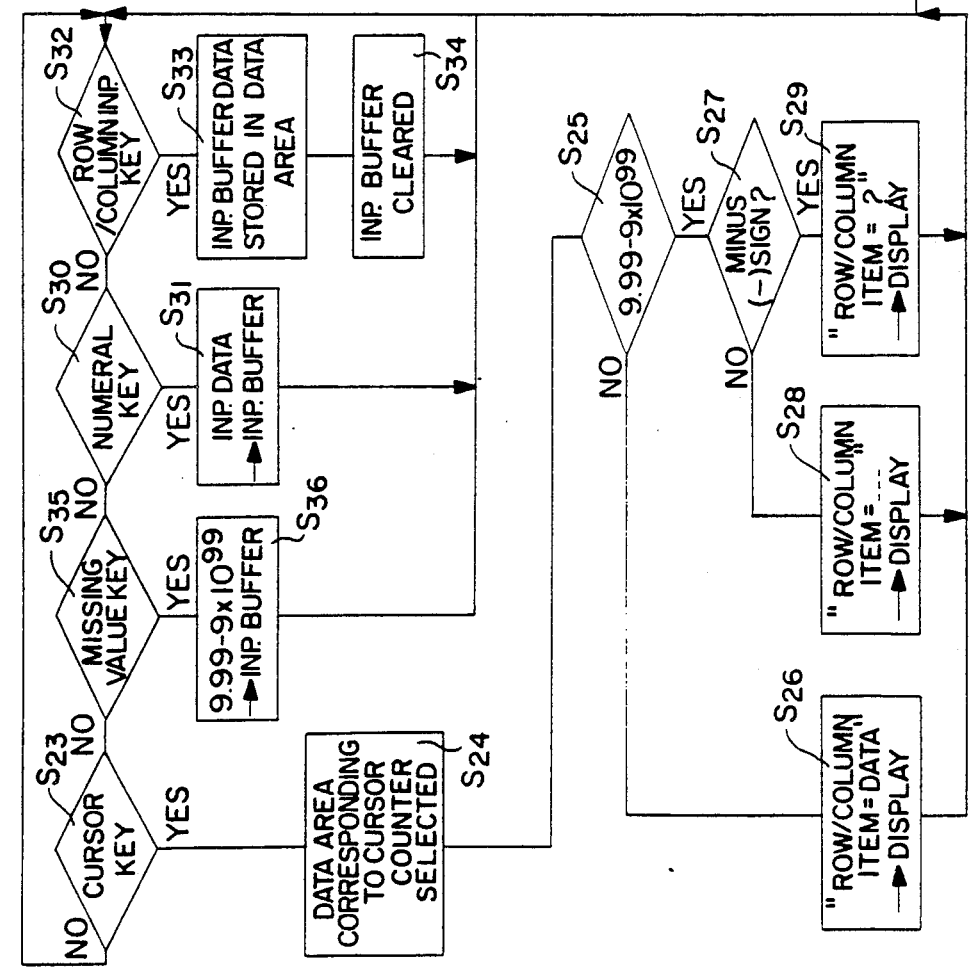

Explanation of the operation of the device is described with reference to the flow chart collectively shown in FIGS. 10(A) and 10(B).

When the table key 31 is operated, the table data, corresponding to the N counter (which is reset at the time of initialization) is selected and moved into the data table area 462 in the step S11, and subsequently the table item name is taken out and provided to the display buffer 43 so as to be displayed on the LCD 2 in the step S12.

If the displayed table item is different from the desired one, the table key 31 is operated once more in the step S13, whereby the reference of the displayed data is executed on the basis of the counter N+1 in the steps S14 to S11 and the table item name of the counter N+1 is displayed in the LCD 2 in the step S12. The above-mentioned operations are repeated until the desired table item is selected (S13 to S14 to S11 to S12).

When the desired table item is selected, the ENTER key is operated in the step S15. When making a new table data, and if the counter of the table items is not displayed because of the un-input of the data is selected, the ENTER key is operated, enabling creation of a new data table.

After the selection of the table item is completed by operating the ENTER key, the row and column items are inputted. In case the row and column item names have been already stored, the item names are displayed in the LCD 2.

In case of inputting a new row and/or column item name, after the portion of an un-input row and/or column item name is displayed by using the row and/or column input keys 32 and 33, the row and/or column item name is inputted by operating the character keys 12 in the step S16, whereby the input data is stored in the input buffer in the step S17.

In step S18 it is determined whether the row/column input keys 32 and 33 are operated. If so, it is then judged in step S19 whether or not the data is stored in the input buffer, subsequently the row/column item names are stored in the table data area in the step S20. Thus, the input of the row/column item names is completed by repeating the above-mentioned operations.

When the input of the row/column item names is completed (the condition that there is no input buffer data in the step S19), the table size is secured in the table data area on the basis of the number of the inputted row/column item names in the step S21, and the minimum value $-9.999999999 \times 10^{99}$ showing the un-input data area written in the table data area in which the numerical data is not inputted in the step S22.

Thus, when the table size is secured and the minimum value $-9.999999999 \times 10^{99}$ showing the un-input data area is written in the display data area, each of the numerical data is inputted.

When the cursor keys 15 are operated in the step S23, the data area corresponding to the cursor counter is selected in the step S24, and it is judged in the step S25 whether or not the data stored in the data area is the maximum or minimum value $9.999999999 \times 10^{99}$. If the data is neither the maximum nor the minimum value $9.999999999 \times 10^{99}$, since the data is stored in this data area, the data is displayed in the form such as "Row/Column Item data" (for example, "Aoki: Mathematics+30") in the step S26.

In case the data stored in the data area is the maximum or the minimum value $9.999999999\times 10^{99}$, it is judged in the step S27 whether the sign of the value $9.999999999\times 10^{99}$ is plus(+) or minus(−) in order to judge whether the value $9.999999999\times 10^{99}$ is the maximum or the minimum. In case the sign of the value $9.999999999\times 10^{99}$ is plus(+), the data stored in the data area is judged to be the missing value and displayed as showing "for example on the LCD 2.

In case the sign of the value $9.999999999\times 10^{99}$ is minus (−), it is judged that no data is stored in the data area and the no data condition is displayed on the LCD 2 as showing "Row/Column Item=?"(for example, "Kato: Mathematics=?") in the step S29, and the numerical data is inputted under the above-mentioned condition.

With reference to the input of the data into the data area, first the cursor keys 15 are operated so as to select the data area in which the data is going to be inputted. When the data is inputted by operating the numerical keys 13 in the step S30, the input data is stored in the input buffer in the step S31. Next, the row/column input keys 31 and/or 33 are operated in the step S32, whereby the data stored in the input buffer is stored in the data area in the step S33 and simultaneously the contents of the input buffer are cleared in the step S34.

Also when inputting a missing value, after the data area is selected by operating the cursor keys 15, the missing value key 34 is operated in the step S35, whereby the maximum value $9.999999999\times 10^{99}$ showing the missing value is stored in the input buffer in the step S36. Then, the row/column input keys 32 and/or 33 are operated in the step S32, whereby the data stored in the input buffer is stored in the data area in the step S33 and simultaneously the contents of the input buffer are cleared in the step S34.

Thus, in case no data is memorized in the data area, in a message such as "Row/Column Item=?" is displayed in the LCD 2, and in case the data stored in the data area is the missing value, the condition of the data is display showing such as "_ _ _" in the LCD2. Therefore, the input condition of the data can be easily judged and also any missing data input can be easily found at the time of inputting or confirming the data.

As described above, when data is not memorized in the data area the display is not limited to the display message "Row/Column Item=?", but any display can be set. Similarly, the display message for indicating missing data is not limited to the display message "_ _ _"

Moreover, the data which can be displayed as a specific character is not limited to the data not stored in the data area and can be set when missing a value and displayed on the LCD 2.

As described above, in the statistic processing system of the second preferred embodiment according to the present invention, when the data stored in the data item area is read out, in case the data is a specific data, a specific character is displayed on the LCD 2 so that the condition of the data input can be easily judged at the time of data inputting or data confirmation, and also a missed data input can be easily found.

Therefore, the data can be inputted more efficiently so as to obtain various kinds of statistic values correctly.

Referring to a detailed explanation of a third preferred embodiment according to the present invention with reference to the drawings is as follows.

Figure 11:
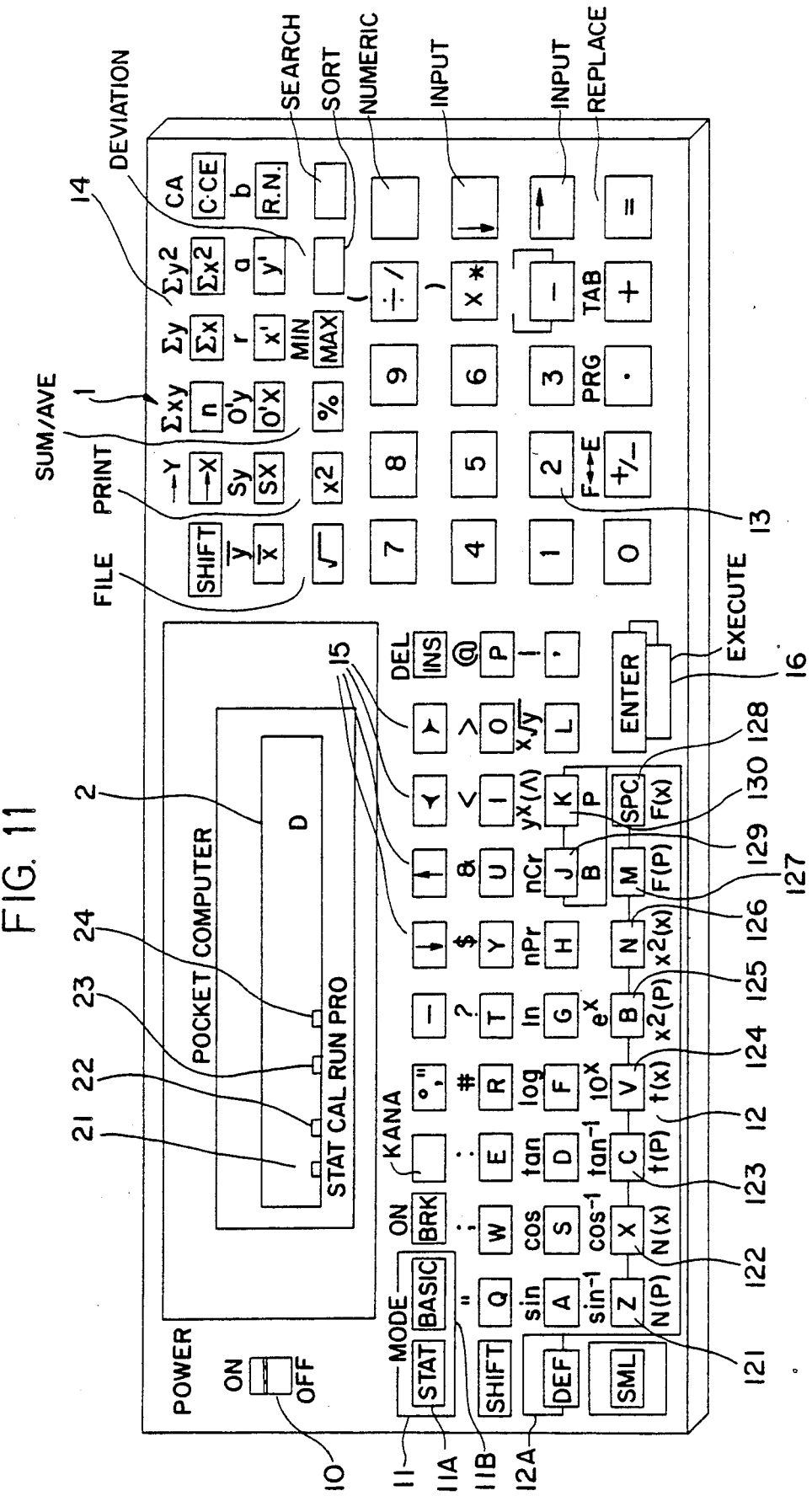
Figure 12:
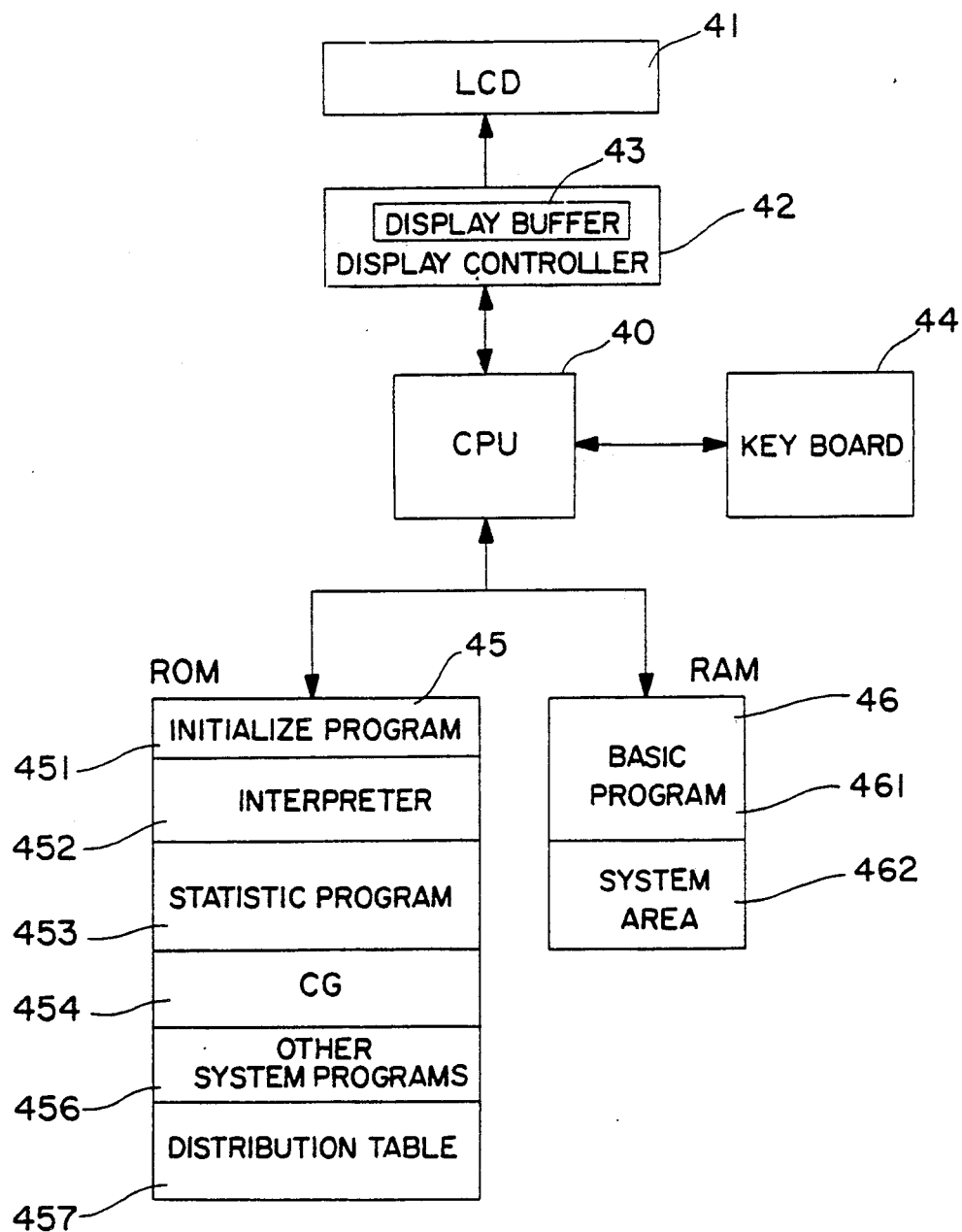

FIG. 11 is a schematic diagram showing a third preferred embodiment of a mini-computer according to the present invention.

Reference numeral 1 denotes a mini-computer, wherein there are provided a liquid crystal display unit (referred to as LCD 2 hereinafter) in its upper left portion and a keyboard comprising character input keys and function keys in the peripheral portion of LCD 2. LCD 2 includes a display capacity of 24 units in one line of a segment type. For example, there are provided indicators 21, 22, 23 and 24 for displaying the mode condition of the mini-computer in the lower portion of LCD 2.

Reference numeral 10 denotes a power switch and by depressing the power switch 10, the mini-computer is powered up and an initialization processing is executed, whereby the mode of the computer is preset into a statistic processing mode (STAT).

Reference numeral 11 denotes mode setting keys comprised of a STAT key 11A for setting the statistic processing mode (STAT) and the calculation mode (CAL) and a BASIC key 11B for setting the program processing mode for BASIC computer language and alternately the program running mode (RUN) and the programming mode (PRO).

The indicator STAT 21 is on during the STAT mode, the indicator CAL 22 is on during the CAL mode, the indicator RUN 23 is on the RUN mode, and the indicator PRO 24 is on during the PRO mode.

Reference numeral 12 denotes a group of character input keys which may also be used as function keys. Particularly in the lower part of the character keys 12, there are arranged a group of character keys which is defined as distribution function keys to be used in the statistic processing by operating the distribution function indicating key 12A.

Referring to the group of distribution function keys, the N(P) key and N(X) key which are allocated to the character Z key 121 and the character X key 122, respectively, are calculation indicating keys of a normal distribution function, wherein the N(P) key is a calculation indicating key for calculating the probability variable X to the upper probability P and the N(X) key is a calculation indicating key for indicating the calculation of the upper probability P from the probability variable X.

The t(P) key and the t(X) key which are allocated to the character C key 123 and the character V key 124, respectively, are calculation indicating keys in a T-distribution function which is used in case of detection or presumption of an average value, detection or presumption of the disparity of two average values. The t(P) key is a calculation indicating key for indicating the calculation of the degree of freedom n and the probability variable X to the upper probability P. The t(X) key is a calculation indicating key for indicating the calculation of the upper probability P from the degree of freedom n and the probability variable X.

The $X^2$(P) key and the $X^2$(X) key (which are allocated to the character B key 125) and the character N key 126, respectively, are calculation indicating keys of an $X^2$-distribution function. These are used in case of detection of presumption of the divergence or in detecting the degree of suitability, wherein the $X^2$(P) key is a calculation indicating key for indicating the calculation of the degree of freedom n and the probability variable X to the upside probability P and the $X^2$ (X) key is a calculation indicating key for indicating the calculation of the degree of freedom n of the upside probability P from the probability variable X.

The F(P) key and the F(X) key which are allocated to the character M key 127 and the space (SPC) key 128, respectively, are calculation indicating keys of an F-distribution function which are used in ascertaining the degree of similarity of the divergence. The F(P) key is used to calculate the degrees of freedom $n_1$ and $n_2$ and the probability variable X to the upside probability P and the F(X) key is a calculation indicating key for indicating the calculation of the degrees of freedom $n_1$, $n_2$ and the upside probability P from the probability variable X.

The B key, allocated to the character J key 129, is a calculation indicating key of the binomial distribution, i.e, the B distribution function, indicating the calculation of the probability of which the phenomena of probability P occurs X times of n times. The P function key, allocated to the character K key 130, is a calculation indicating key of the Poisson's distribution function, i.e., P distribution, indicating the calculation of the probability of which the phenomena of average m occur X times.

The calculations of the above-mentioned distribution function are generally known in statistics. The calculation processing routine for the above-mentioned calculations are stored in non-volatile memory in the mini-computer according to the present invention.

Reference numeral 13 denotes numerical input keys and the arithmetic calculation keys. Reference numeral 14 denotes a group of calculation indicating keys for calculating the average value and the deviation in the statistic processing.

Reference numeral 15 denotes cursor mark movement keys of the LCD 2, reference numeral 16 denotes an entering key for indicating the execution of the calculation.

FIG. 13 is a diagram showing the suitability or unsuitability of:
(1) the precision of the obtained value;
(2) the necessary memorizing capacity; and,
(3) the necessary processing time until the value is obtained (whether or not the value is calculated in less than a few seconds), of the way of calculating the distribution function as follows:
(A) the way of using the approximate expressions;
(B) the way of using the recurrence formulas;
(C) the way of memorizing the distribution lists in the memory.

In FIG. 13 the suitability (0 mark) and unsuitability (X mark) are shown as illustrating when the degree of freedom n is large (N≧40) and small (n<40) when the t-distribution function is adopted, for example. In the case of a large degree of freedom, a calculation value with high precision can be obtained by using the approximate expression. However, in the case of a small degree of freedom, since the calculation value with bad precision is obtained by using the approximate expression, the recurrence formula should be used. It is impossible because of the memorizing capacity limit to memorize all of the calculation values of the recurrence formula in the range of using the recurrence formula.

But in the function t(n,p) calculating the value t of the distribution point from the upside probability P of the T-distribution, the parameters are the degree of freedom n and the upside probability P, and in the upside probability P there are a few probabilities with very high frequency of use.

In the mini-computer according to the present invention, the approximate expression is used in case a large degree of freedom and the recurrence formula is used in case of a small degree of freedom. Moreover, only the calculation values of the recurrence formula of the part of the upside probabilities P with high frequency of use are memorized, whereby the calculation speed can be made higher.

FIG. 14 is a view showing an example of the division of the T-distribution calculation in the mini-computer according to the present invention, wherein assuming that the upside probabilities P with high frequency of use are 5% and 1%, the calculation values of the recurrence formula of the above-mentioned upside probabilities P equal 5% and 1% are stored in ROM 45.

Figures 15, 16:
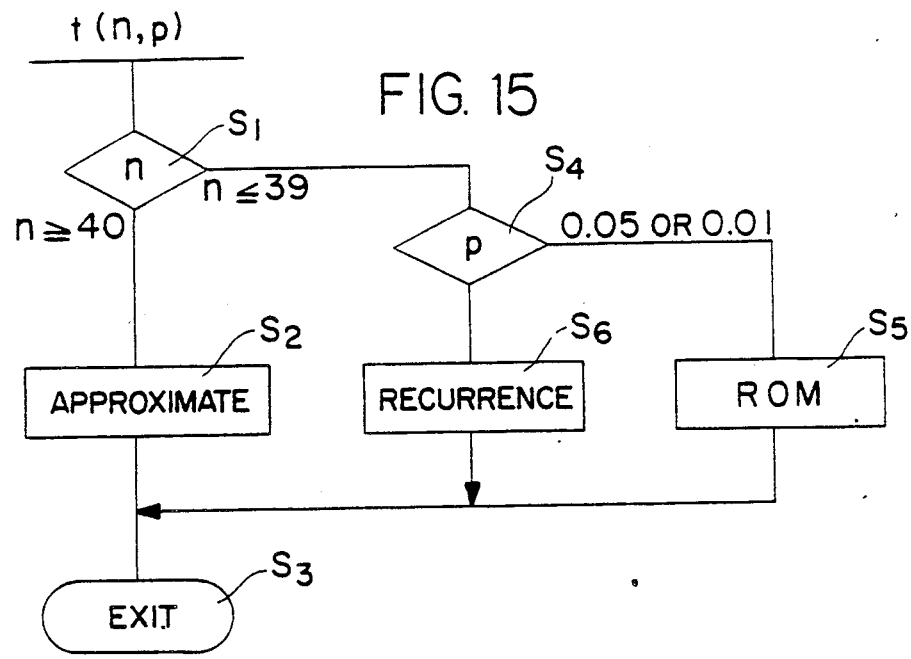

FIG. 15 is a flow chart showing a dividing process by which the calculation of the function t(n,p) is executed.

First it is judged in the step S1 whether or not the degree of freedom is more than 40. If more than 40, the calculation is executed by using the approximate expression in the step S2 and the calculation value is displayed in the LCD 2 in the step S3.

In case the degree of freedom is less than 39, it is judged in the step S4 whether or not the upside probability P is stored in the ROM 45. The upside probability P is stored in ROM 45 in the step S5 and the calculation value is displayed in the LCD 2 in the step S3.

If the upside probability P is not stored in ROM 45, calculation of the distribution function is executed by using the recurrence formula in step S6 and the calculation value is displayed in the display unit in the step S3.

The calculation sequence for each of the distribution function keys is stored semi-permanently in the statistic processing program in ROM 45. Each calculation sequence is processed corresponding to the flow chart shown in FIG. 15. That is, it is judged whether each calculation of the normal distribution function, t-distribution function, $X^2$-distribution function and F-distribution function is executed on the basis of the approximate expression, the recurrence formula or the predetermined statistic values list depending on the condition of the degree of freedom n and the upside probability P. The calculation value is transferred to the LCD 2 to be displayed.

Similarly, the order of the BASIC language functions shown in FIG. 17 is provided corresponding to the calculation keys of the above-mentioned distribution functions. The statistic calculation can be executed by creating a BASIC user program. The above-mentioned calculation sequence adopting the calculation routine on the basis of the keys, the calculation value can be displayed as mentioned above and also can be stored in other specific registers.

Two ways of calculating the distribution function in the mini-computer are as follows:
(I) By linking with the BASIC program; and
(II) By pressing a key defined for the distribution function, a variable input message is displayed on the LCD 2 and the value depending on the displayed message is inputted, whereby the function value can be obtained and displayed in the LCD 2.

Each operation is explained in detail hereinafter.

As an example of (I) in the t-distribution of the degree of freedom n where the function t(n,p) is determined by the upside probability P is defined as PTD(n,p), on the condition of BASIC input of a minicomputer, when PTD(9, 0.01) and ENTER is inputted, the value 2.821 of the function when the upside probability is 1% in the T-distribution of 9 degrees of freedom is displayed on the LCD 2.

If X=PTD(9, 0.01) is set in the BASIC program, the above-mentioned value 2.821 is substituted.

The same value as mentioned above can be obtained as follows:

N=9: P=1: X=PTD(N, P/100)

In an example of (II), the t-distribution function PTD(n, p) is allocated to the character C key 123 and the calculation is executed by operating the allocated t(p) key.

That is, the mini-computer is set in the STAT mode for executing the statistic calculation function in a deskcomputer. When the distribution function key 12 and subsequently the t(p) key are inputted under the condition of STAT mode, the calculation process enters the sequence for obtaining the T-distribution function PTD(n, p). The operation for obtaining the function PTD 9, 0.01 is shown in detail with reference to the steps S11 to S15 in FIG. 16.

The step S11 shows the condition of waiting for the input of the degree of freedom n in the t-distribution by inputting the function t(p) key and the step S12 shows the condition of inputting 9 as the degree of freedom n. The step S13 shows the condition that the ENTER key is sequentially inputted after inputting 9 as the value n and the input of the upside probability P as the next variable is waited. The step S14 shows the condition of inputting 0.01 as the value of the upside probability P. In step S15, the ENTER key is sequentially inputted after inputting 0.01, whereby the value 2.281 is obtained as the value of the t-distribution function PTD(9, 0.01) to be displayed. As described above, in the present embodiment when calculating the value of the distribution function, since the display indicating an input of a necessary variable is displayed, the operation can be made easy.

Figure 18:
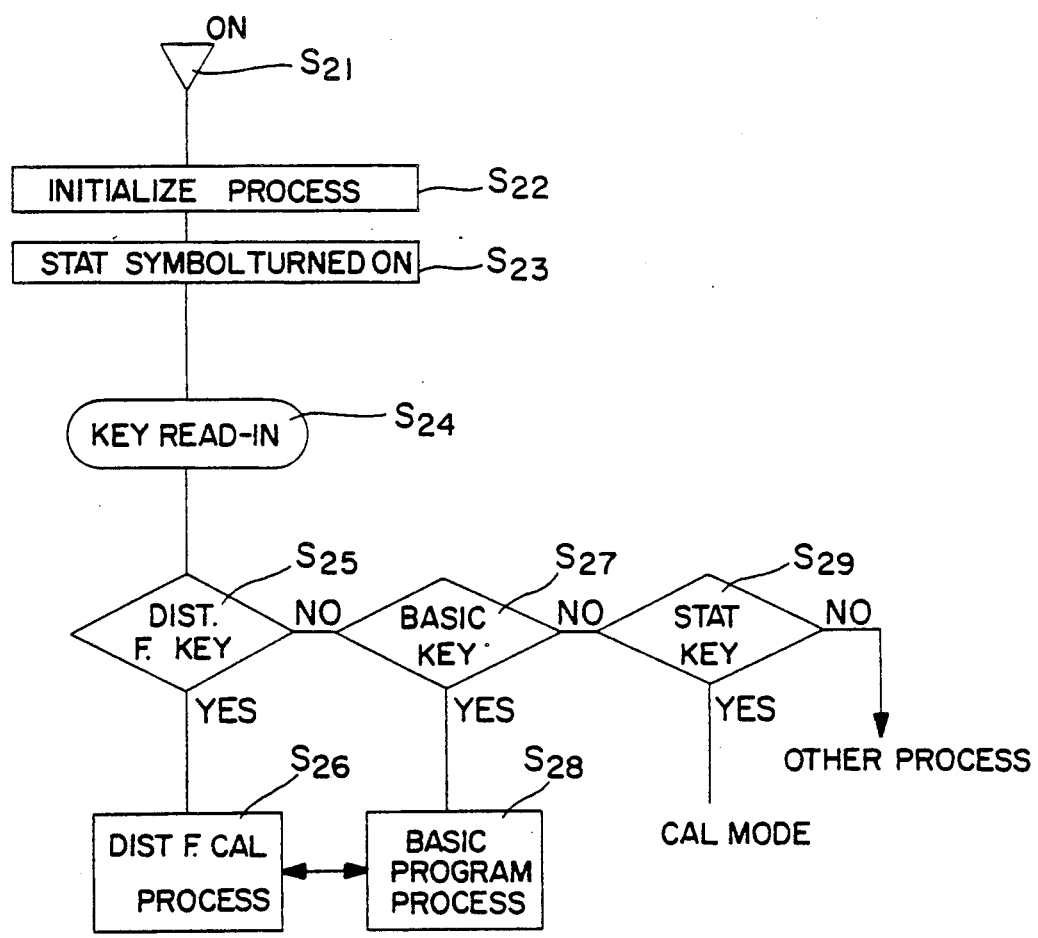

FIG. 18 is a flow chart showing a setting action of the mode condition of the mini-computer according to the present invention. When the power is supplied in the step S21, the initializing program stored in the ROM 45 is performed in the step S22, and the initialization is executed and the STAT symbol 21 is turned on and a statistic processing mode is set in the step S23. (The display "0" is displayed.) Under this condition, the reading-in key is executed in order to judge whether the BASIC mode or the calculation mode (CAL mode) is set by operating the mode setting key 11 in the step S24.

When the distribution function indicating key 12A is operated, the calculation processing indicated by the distribution function key group 12B is executed in the step S26.

In the next step S27 the BASIC key is operated and in the step S28 the BASIC processing mode is set and the BASIC program processing is executed. In the BASIC mode the BASIC key is operated again, whereby the programming mode (PRO) or the program running mode (RUN) is selected.

In addition, the STAT key is operated in the step S29 so as to set the CAL mode and other mode setting keys are operated so as to set the corresponding mode.

The mini-computer according to the present invention comprises the distribution function calculation indicating keys, the numerical keys for inputting the variables such as probability values and the degree of freedom and the non-volatile memory for storing the distribution function calculation routine on the basis of the distribution function calculation indicating keys, so that calculation of a statistic examination and estimation of a section can be executed without reference to the statistic numerical lists so as to be very convenient.

Moreover, since calculation of the distribution function is executed by selecting one of the distribution function calculation routines such as the approximate calculation routine, the recurrence formula calculation routine, or the calculation routine for selecting the corresponding calculation value of the calculation values group predetermined stored fixedly, the calculation value can be obtained in a short time with high precision, high calculation ability and a small memory capacity.

The fourth preferred embodiment of the present invention is explained with reference to FIGS. 19 to 21.

Figure 19:
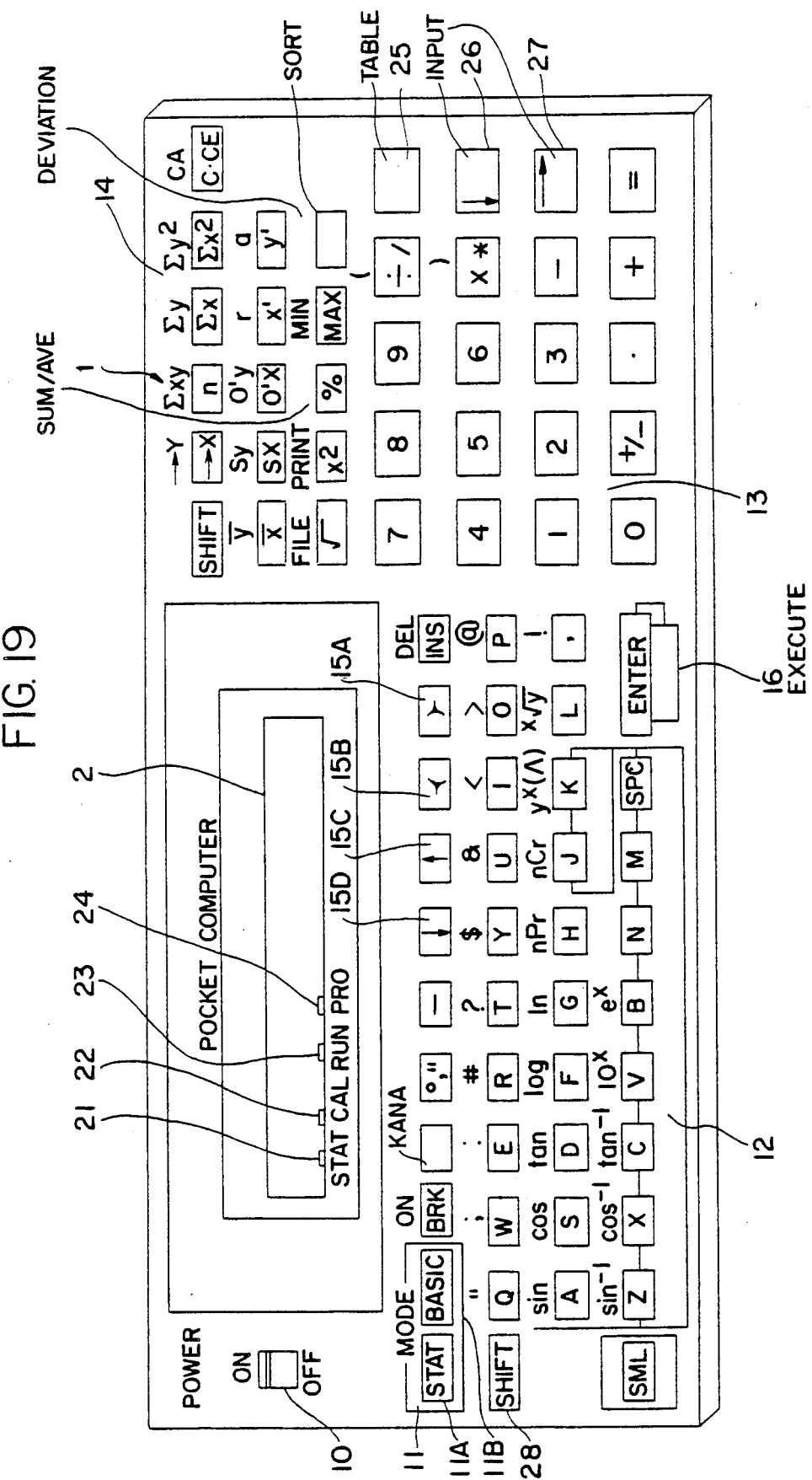

In FIG. 19 when the cursor keys 15A, 15B, 15C and 15D are operated sequentially after operating the SHIFT key 28, the item at the edge portion of the row or column of the item being displayed on the LCD 2 is selected and displayed.

The operation of the cursor keys 15A, 15B, 15C and 15D after operating the SHIFT key 28 will be explained with reference to FIG. 21.

Figure 21A:
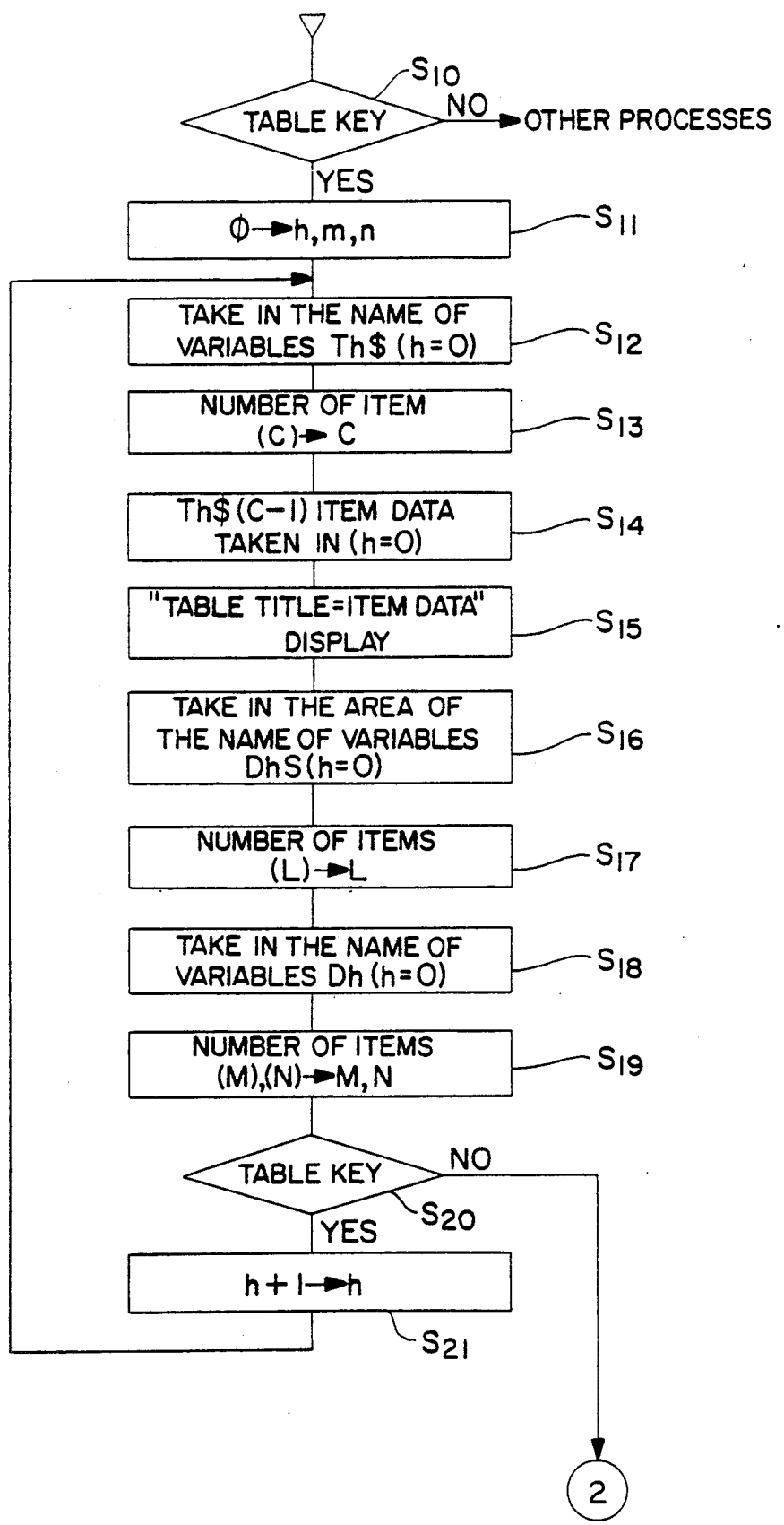
Figure 21B:
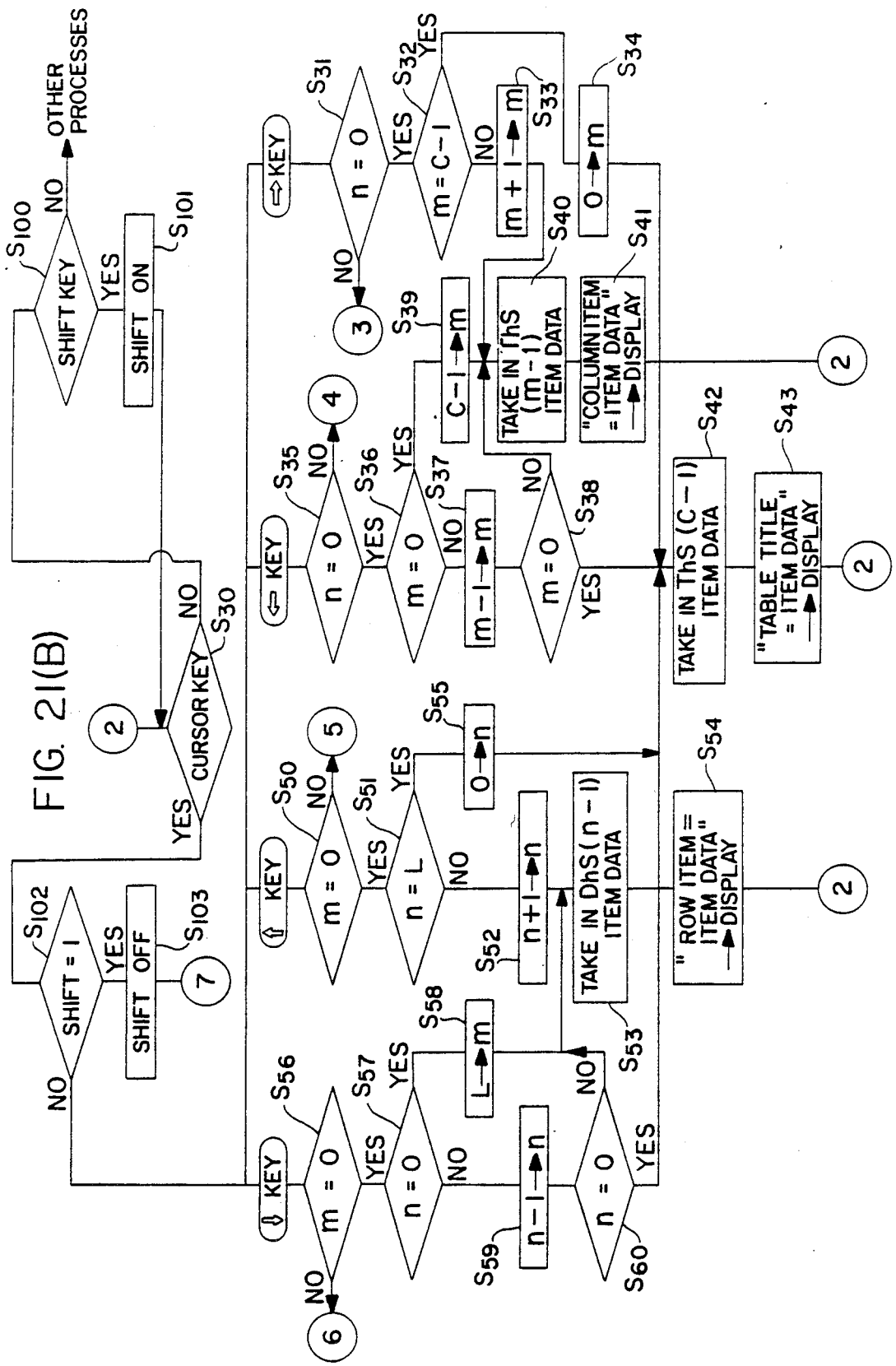
Figure 21C:
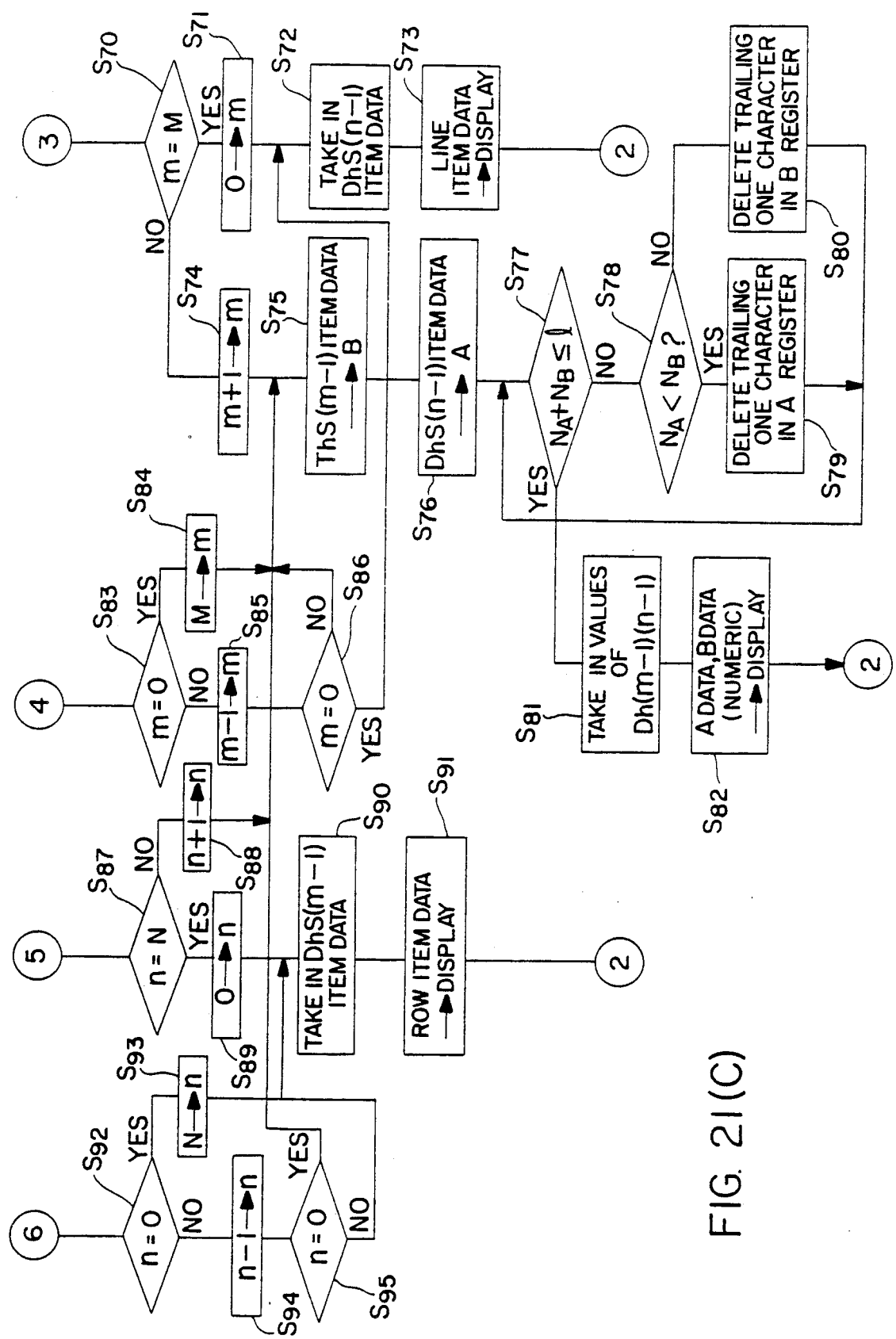

In FIG. 21(B) when the SHIFT key 28 is operated in the step S100, the SHIFT flag provided in the system area 463 is turned on in the step S101 and the next operation of the cursor keys 15A, 15B, 15C or 15D is awaited in the step S30. When any of the cursor keys 15A, 15B, 15C or 15D is operated, it is judged in the step S102 whether or not the SHIFT flag provided in the system are 463 is turned on, and then the SHIFT flag is turned off in the step S103.

Figure 21D:
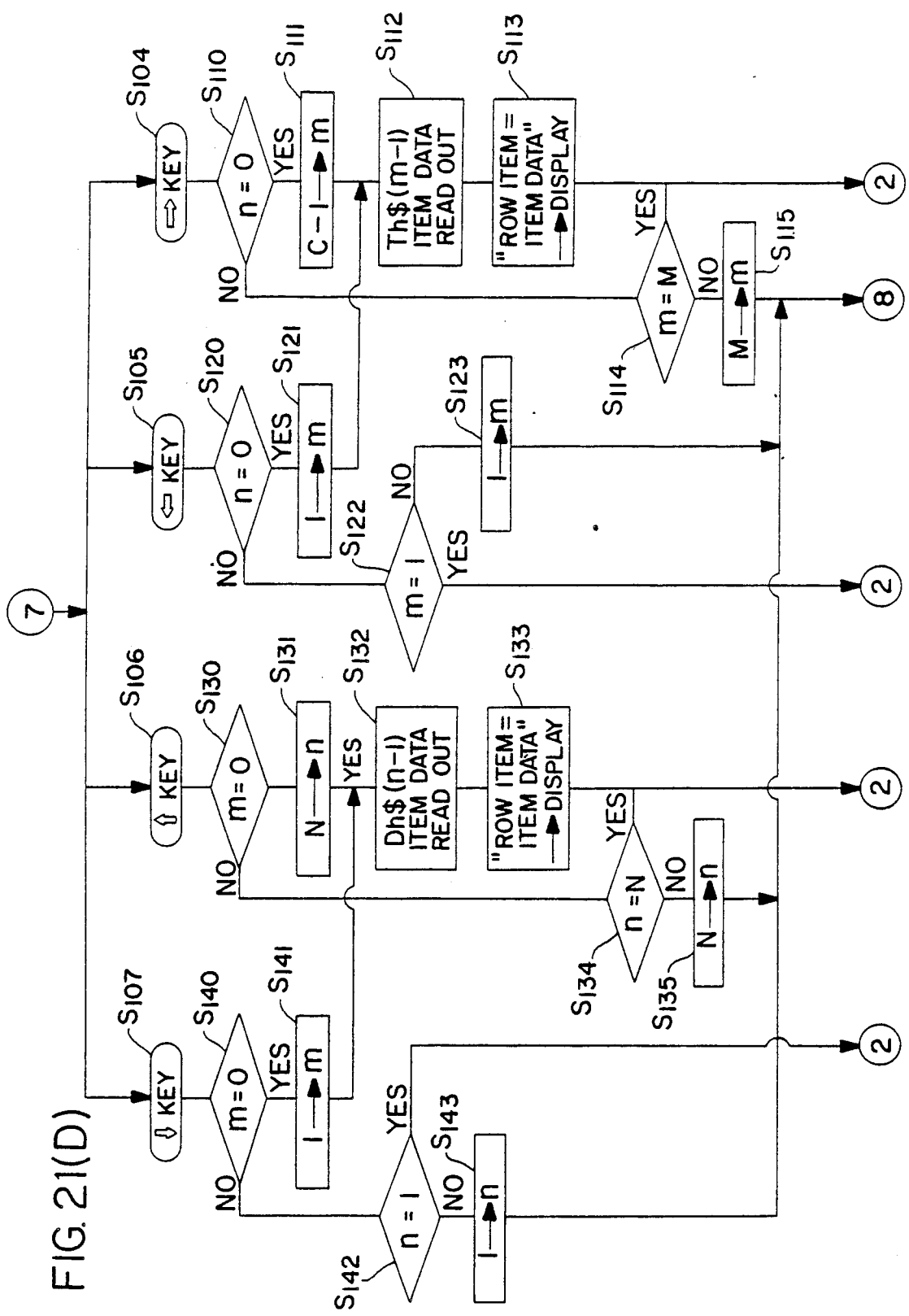

As shown in FIG. 21(D), when the cursor right shift key 15A, for example, is operated in the step S104, it is judged in the step S110 whether or not the count value n equals 0. In case the count value n is equal to 0, in other words, in case the column data item is displayed, the value $C-1$ (subtracting 1 from the item number C) is stored in the m counter in the step S111, and the variable name Th$(m−1) or T$\phi$$(3) is read out from the table data area 462 in the step S112 and then in case of the present embodiment "Column item=Japanese" is displayed on the LCD 2 through the display buffer 43 in the step S113.

In case the count value n is not equal to 0, in other words, in case the data item is displayed, it is judged in the step S114 whether or not the count value m is equal to M, in other words, whether or not the data item being shown is the rightmost item, and in case the data item is the rightmost item (m =M), the operation of the cursor right shift key 15A is ignored and the data item being shown is displayed. In case the data item shown is not the rightmost item (m =M), the value M corresponding to the data item of the right most row is stored in the m counter in the step S115. Subsequently, the above-mentioned operation in the steps S75 to S82 (see FIG. 21(C)) is executed and "row item name: column item name =data item" such as "Aoki: Japanese=93" is displayed.

On the other hand, when the cursor left shift key 15B is operated in the step S105, it is judged in the step S120 whether or not the count value n is equal to 0, and in case the count value n is equal to 0, in other words, in case the column item is displayed, the value 1 is stored in the m counter (1→m) in the step S121 and then the above-mentioned operation in the steps S112 and S113 is executed so as to display the leftmost item ("Mathematics" in the present embodiment).

In case the count value n is not equal to 0, in other words, in case the data item is displayed, it is judged in the step S122 whether or not the count value m is equal to 1 (i.e., representing the leftmost item), the operation of the cursor key 15B is ignored and the data item being displayed now is displayed as it is. In case the count value m is not equal to 1, the value 1 is stored in the m counter (1→m) in the step S123 and subsequently the above-mentioned operation in the steps S72 to S82 (see FIG. 21(C)) is executed and the leftmost data item such a "Kato: Mathematics—85" is displayed.

When the cursor up shift key 15C is operated, the operation of the steps S106 and S130 to S135 is executed. In case the row item name is displayed, the bottom row item name "row item Yokota" is displayed. If the data item is displayed, the bottom data item such as "Yokota: English=29" is displayed.

When the cursor down shift key 15D is operated, the operation of the steps S107 and S140 to S143 is executed and in case the row item name is displayed, the top row item name "row item=Aoki" is displayed, and in case the data item is displayed, the top data item such as "Aoki: Mathematics=30" is displayed.

As described previously, in a mini-computer according to the present invention, since the item names of the row and column of the desired end portion of the data and the character or numerical data in a corresponding end portion can be displayed on the LCD 2 by the operation means for indicating and selecting the end position of the desired row and column in the table data memory, when the data in the end position or near the end position of the table data is to be displayed on the display unit, the desired data item can be displayed with fewer operations without moving the data item in up, down, right or left directions, so that the operating efficiency can be remarkably improved. The more table data present, the shorter the operating time for displaying the data table as compared with a conventional mini-computer.

The fifth preferred embodiment is explained below with reference to FIGS. 22 to 27.

Figure 22:
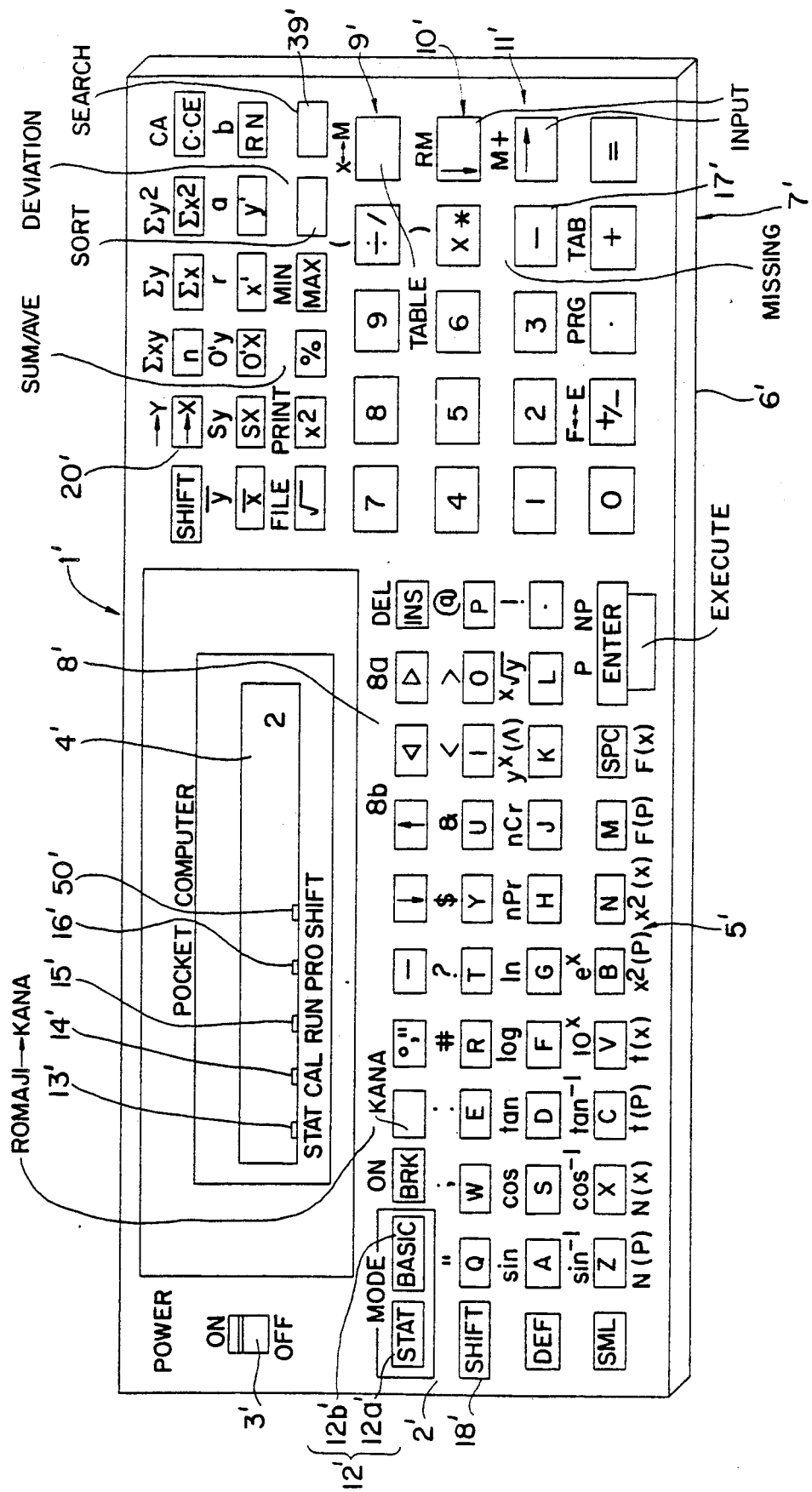
Figure 23:
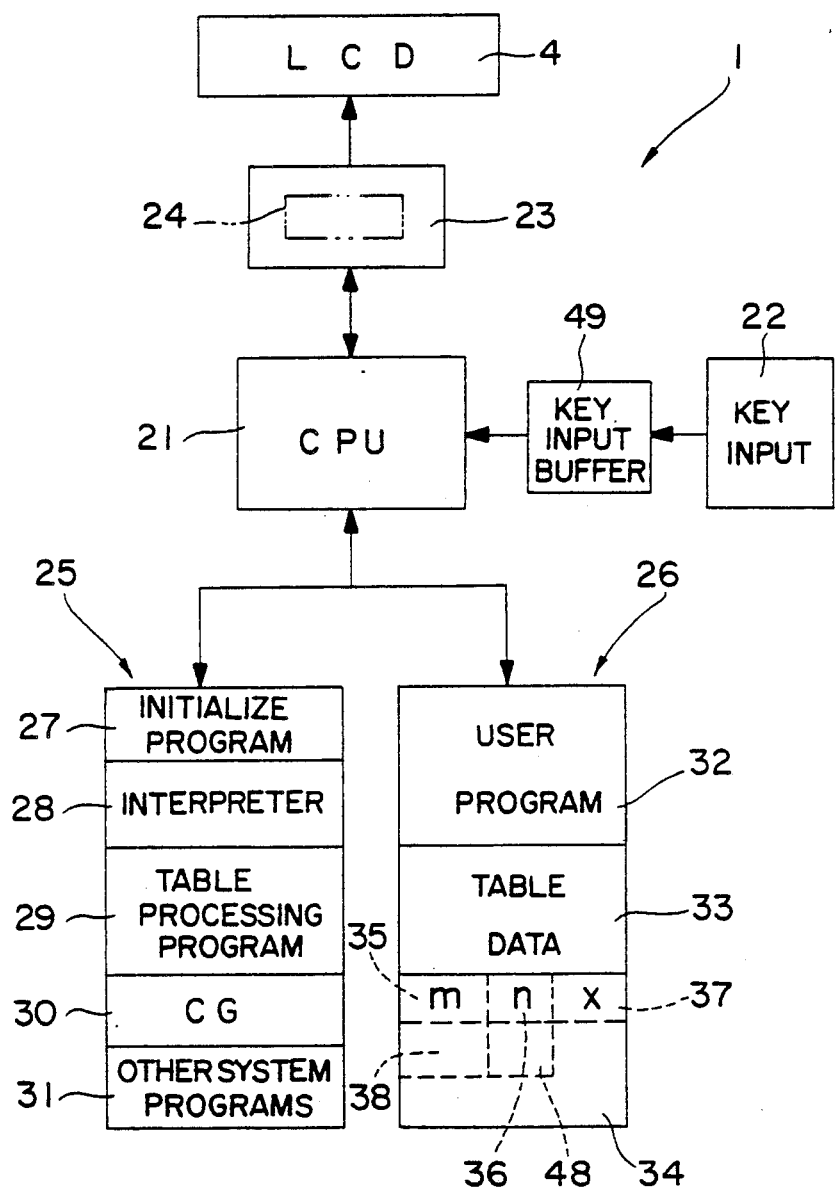

FIG. 22 is a front view showing a data processing device, so called a pocket computer 1' of an embodiment 5' according to the present invention. FIG. 23 is a block diagram of the computer 1' shown in FIG. 22. The constituent elements of the computer 1' will be explained with reference to FIGS. 22 and 23. There is provided a power switch 3' on the left upper portion of the front plane 2' of the computer 1'. When the power switch 3' is turned on, the power can be supplied to the computer 1' and the computer 1' is initialized and set in a statistic processing mode (STAT).

There is provided a display unit 4' made of liquid crystal display element (LCD). The display unit 4 is for example a matrix operational type with a display capacity of a one 24 character line, and there are provided indicators 13 to 16 and 60 at the lower portion of the display unit for displaying various operation modes of the computer 1'.

In the near portion of the display unit 4' there are provided a group of character input keys 5' including function keys which are operated when characters such as item names are inputted at the time of making a table. Also provided are numerical input keys group 6', so called ten keys, calculation symbols (such as +, −, ×, ÷) input keys group 7' and cursor keys group 3'. A table key 9' is operated for making a table data as mentioned below. Reference numeral 10' denotes a row input key which selects each of the rows to be inputted of the data matrix at the time of making a two dimensional data table. Reference numeral 11' denotes a column input key which selects each of the columns to be inputted of the data matrix as well as the row input key 10'.

There are provided mode setting keys 12' consisting of a STAT key 12a' for alternately setting the computer 1' in the statistic processing mode (STAT) and a calculation mode (CAL) every operation of the STAT key 12a' and a BASIC key 12b' for setting the computer 1' in a program processing mode (RUN) using BASIC language in addition to an operation of switching between a RUN mode in which the computer 1' executes the program and a programming mode (PRO) alternately every operation of the BASIC key 12b'.

During the STAT mode, the indicator STAT 13' is on and during the CAL mode, the indicator CAL 14' is on. Similarly, during the RUN mode, the indicator RUN 15' is on and during the PRO mode, the indicator PRO 16' is on. When the shift key 18' is pressed, the indicator 50' is on. The minus sign key 17' is defined as a missing value key for indicating the absence of a data item in the statistic processing by switching the shift key 18'. Reference numeral 19' denotes a function key group for calculation of various kinds of statistic processing such as the sums, average values, deviation values of the row and column of table data, using the table data inputted and stored in the table data area as mentioned below. The statistic calculation processing is executed by operating the above-mentioned function keys group 19' and the calculated results are displayed on the display unit 4 and stored in the predetermined position of the table data area 33.

A variable indicating key 20' indicates a single variable statistic processing key (→X key) or a dual variable statistic processing key (→Y key), which is switched by operating the shift key 18. The above-mentioned→X key and→Y key execute the statistic processing of one or two column items, respectively. Moreover, there is provided a search key 39' for searching the data item in the table data and displaying them on the display unit 4.

The computer 1' comprises a central processing unit (referred to as CPU 21 hereinafter) for executing various kinds of data processing. The CPU 21 is connected to the key input portion 22 including the character input key group 5' and the key input buffer 49 is connected to the display unit 4' through the display control unit (DCU) 23. There is provided a display buffer in the display control unit DCU 23 for storing temporarily the data to be displayed on the display unit 4'.

Moreover, the CPU 21 is connected to a fixing memory 25 made of ROM (read only memory) and to a memory 26 made of RAM (random access memory).

ROM 25 comprises an initializing program area 27 for storing the initializing program which controls the initializing processing, an interpreter area 28 for storing the interpreter program for the BASIC language used in the computer 1', a statistic processing program area 29 for storing a statistic processing program as mentioned below, a character generator (referred to as CG) program area 30 for storing the CG program which generates display character of dot patterns corresponding to the code information of the character code data to be inputted into CPU 21 depending on the operation of the key input portion 22, and a system program area 31 for storing various kinds of system programs.

RAM 26 includes a user program area 32 for storing one or more user written BASIC programs or various data, a table data area 33 for storing table data prepared in the statistic processing and a system area 34 for allocating various buffers, counters and registers. The system area 34 contains m, n, X registers 35, 36, 37, respectively, a comparing buffer 38, and a counter 48.

Figure 24:
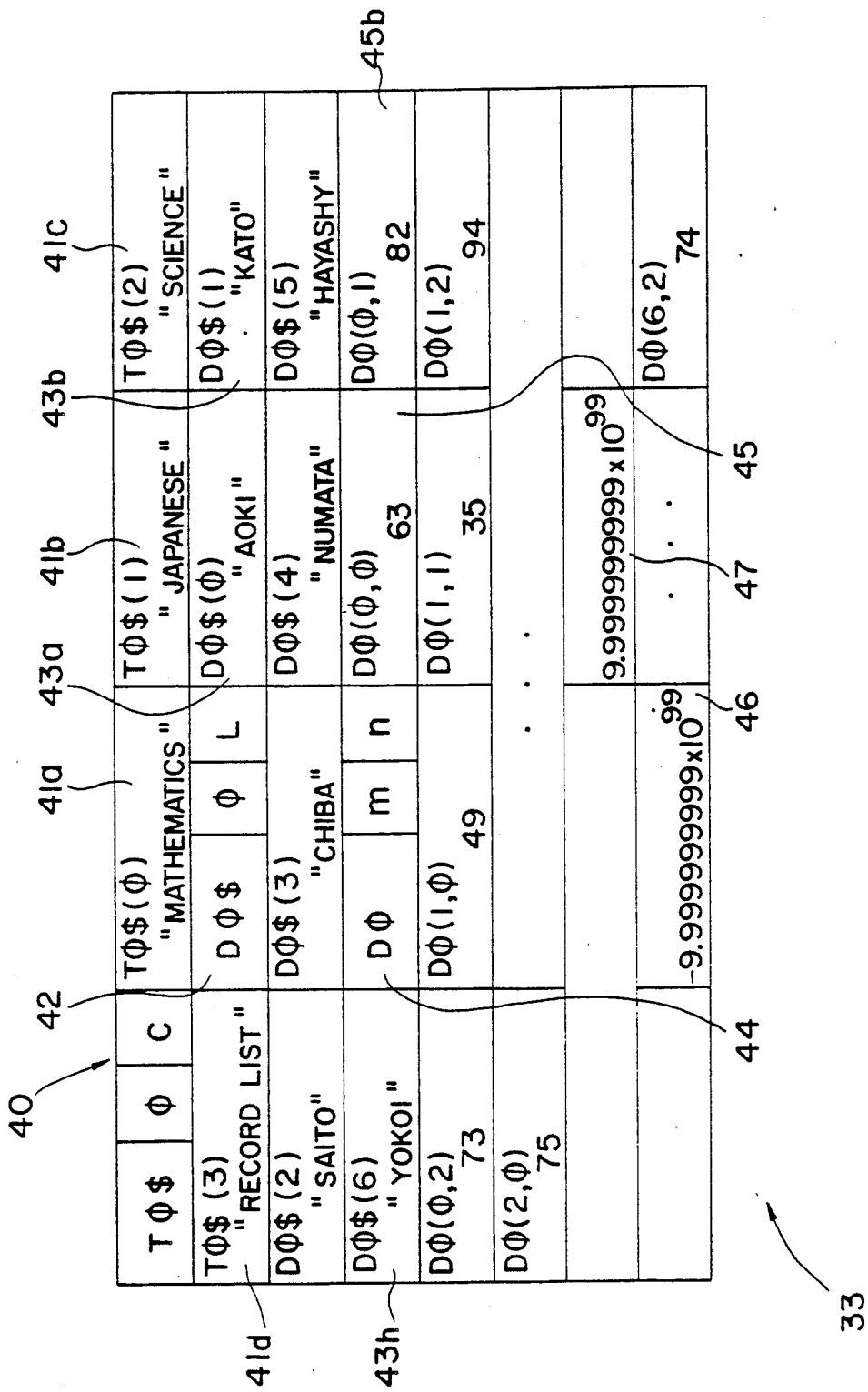

FIG. 24 shows the various data allocated in the table data area 33. The table data area 33 is allocated to a part of the user program area 32 and each of the data in the table data area 33. An example of the data stored in the table data area 33 is shown in FIG. 24. The data corresponds to the Table 2 and each of the items of the table data is 16 bytes in length.

TABLE 2

(RECORD LIST)

|  | Mathematics | Japanese | Science |
|---|---|---|---|
| Aoki | 63 | 82 | 73 |
| Kato | 49 | 35 | 94 |
| Saito | 75 | 63 | 83 |
| Chiba | 93 | 46 | 63 |
| Numata | 24 | 35 | 42 |
| Hayashi | 38 | 79 | 56 |
| Yokoi | 63 | 95 | 74 |

In the header address side of the table data area 33 there is provided a defining area for defining and allocating a string function Th$(cl) to which the title of the table and the column item name of the table are allocated and the number of column items (in fact the number of column items + 1). Subsequently, there are defined column item name areas $41a$ to $41b$ for storing the column item name shown in Table 2 by using the count value cl of the C register as a parameter as follows.

$$T\phi\$(\phi) = \text{"Mathematics"} \ldots \quad (1)$$

There is sequentially provided a defining area 42 to store the string function Dh$ (L) to which the data of the row item name such as "Aoki" in Table 2. Subsequently there are defined row item name areas $43a$, $43b$, $43c \ldots$, $43h$ as a parameter of the count value L so as to store the respective row item names as follows for example:

$$D\phi\$(\phi) \text{ "Aoki"} \ldots \quad (2)$$

Sequentially there is provided a defining area 44 for defining a numerical function Dh(ml, nl) to which the input data corresponding to the record in the case of Table 2 and then there are sequentially provided data areas $45a, 45b, \ldots, 45h$ so as to store each of the inputted data as follows for example:

$$D\phi(\phi, \phi) = 30 \ldots \quad (3)$$

The above-mentioned data are automatically allocated to the table data area 33 whenever inputting by varying the order by using the BASIC language. The address value of the data position is calculated by the variable names and the number of items stored in the defining areas 40, 42 and 44 for reading out the data. Linking between the statistic processing data and the BASIC program can be done by including the one dimensional or two dimensional arrangement functions T$\phi$$, D$\phi$$; D$\phi$ (ml, nl), which can be used in the BASIC program, together with the table data inputted for use in the statistic processing. In the present embodiment, the value to be stored in the variable area in the BASIC language is in the range of the value more than $-9.999999999 \times 10^{99}$ or less than $9.999999999 \times 10^{99}$.

The data shown in the area 46 of the table data area 33 is a non-entered data which is allocated to the memory area estimated by the maximum column length M and the maximum row length N of the data matrix defined in the defining area 44 in case the input operation of the computer 1' is not executed and all of the data are stored in the corresponding area in the table data area 33. The data $9.999999999 \times 10^{99}$ shown in the area 47 is a missing data representing the absence of the data.

The numerical data in the areas 46 and 47 are the minimum and maximum data which can be used in the computer 1''. The function of the minimum and maximum data for representing the non-input or the absence of the data are used, is described as follows. Though in the computer 1' a specific code in the BASIC language can be used for the above-mentioned purpose, the computer 1' enables the program processing of the BASIC language so as to use various kinds of code systems. Accordingly, the maximum and minimum valued data are used in order to prevent such code systems from being effectively limited. These values are used since there seldom occurs the maximum and minimum data in the data processing of the computer 1'.

As described above, the computer 1' includes variable data in the BASIC language together with the table data to be used in the statistic processing, therefore, the variable data position can be accessed by the command in BASIC language.

For example, the defining area 40 and the column item area 41 are allocated with DIMT$\phi$\$($\phi$), T$\phi$\$(1) and T$\phi$\$(2) by the BASIC command and the data "Mathematics" is stored by the input of T$\phi$\$($\phi$) = Mathematics. When the variable name of T$\phi$\$($\phi$) is indicated, the variable data area in the memory 26, the table data area 33 is searched in turn and the corresponding address is accessed The column item area $41d$ is a table title item. The table data shown in FIG. 24 represents the display data column in Table 2.

The statistic calculation processing is executed on the basis of the table data by operating any key of the function keys group 19, and the calculated value as well as said variable name is allocated to the table data area 33 as a new data item. Therefore, the variable name can be indicated and used in the program processing of the BASIC language.

As described previously, the table data made by the statistic processing can be used in the BASIC program and the table data made by the BASIC program can be used in the statistic process.

Plural table data can be sequentially made in the table data area 33. In case the data table is made in the statistic processing, though the explanation is omitted, the table data is allocated to the memory 26 every time each row and column are indicated as well as the BASIC program as shown in FIG. 24.

Figure 25:
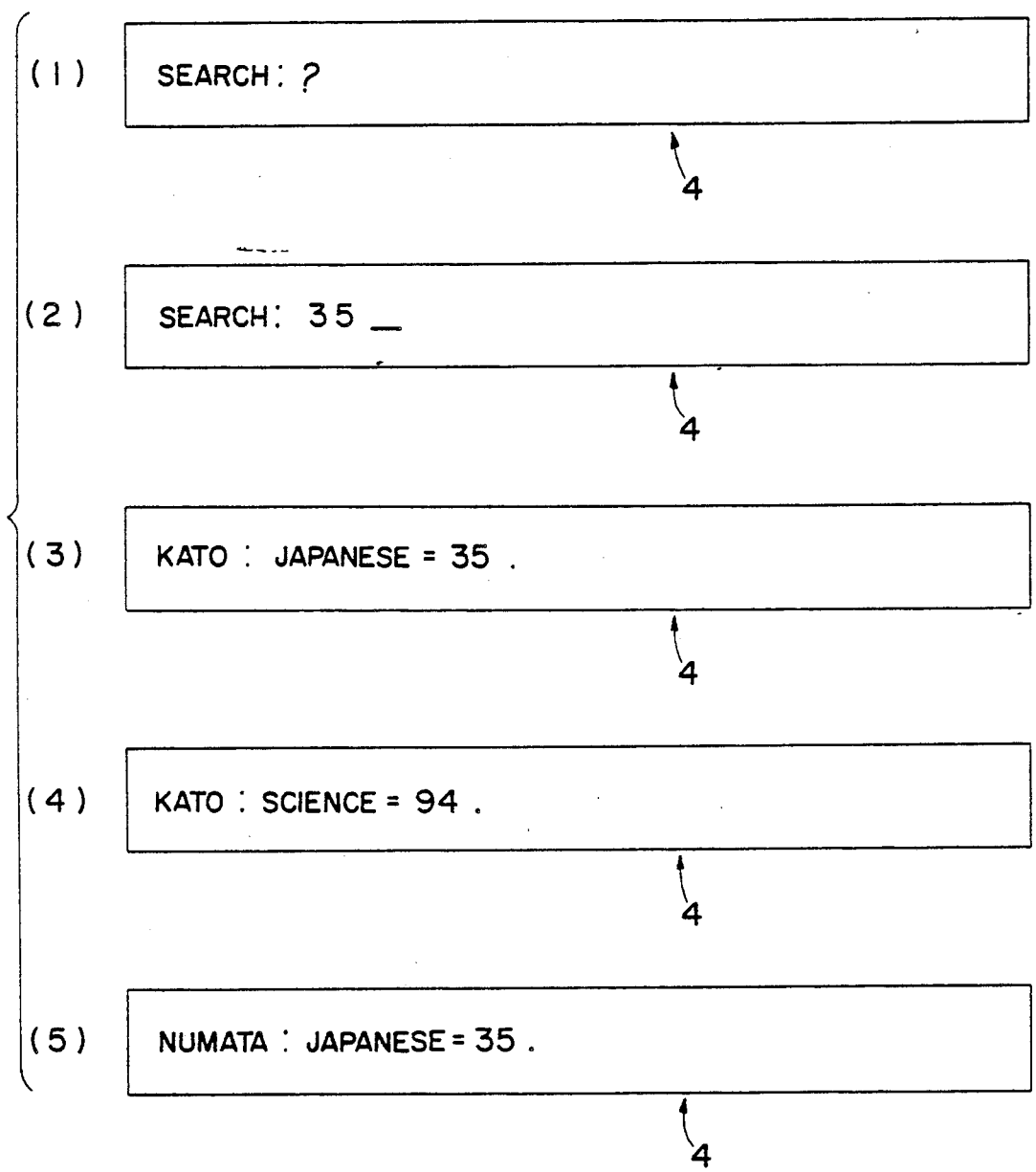

FIG. 25 is a view showing a display example on the display unit 4' of the pocket computer 1' according to this preferred embodiment.

Figure 26:
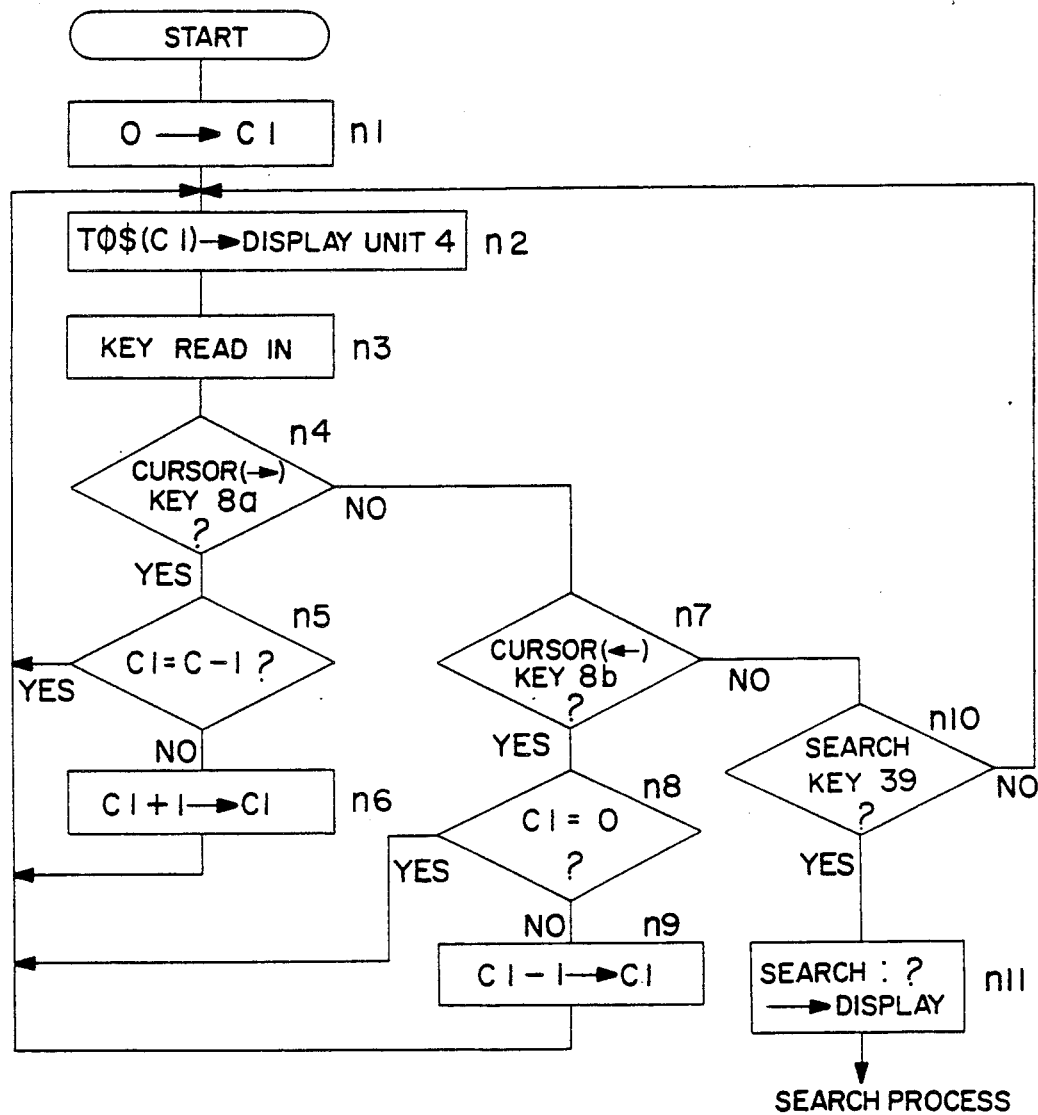

FIGS. 26 and 27 are flow charts showing a searching process using the present embodiment. The process of the embodiment according to the present invention will be explained with reference to FIGS. 22 to 27. Assuming that the table data shown in Table 2 are stored in the table data area 33 in the computer 1'. In FIG. 26, in case the column item name "Japanese" for example in Table 2 is displayed on the display unit 4' of the computer 1', the count value cl which is a parameter showing the row item name or each column item in Table 2 is set to "0" in the step nl and the string function Tφ$(cl) (cl=0) corresponding to the count value cl is displayed in the step n2.

In the step n3, the key to be operated is read in the key input portion 22. In the step n4, it is judged whether or not the read-in key is a cursor right shift key 8a, and in case of the cursor right shift key 8a, it is judged in the step n5 whether or not the count value cl indicates the right edge of the table (cl=c−1). In case the count value cl does not reach the right edge of the table (cl=c−1), the count value cl is added by 1 in the step n6 and the program goes back to the step n2. That is, the item name of the next column "Science" is displayed on the display unit 4'.

In case the count value cl reaches the right edge of the table (cl=c−1), the program goes back to the step n2 without adding 1 to the count value cl. That is, the same display is repeated on the display unit 4'. In case the read-in key is not the cursor right shift key 18' in the step n4, it is judged in the step n7 whether or not the read-in key is a cursor left shift key 8b. In the case of the cursor left shift key 8b, it is judged in the step n8 whether or not the count of cl is decreased by 1 in the step n9 and the process goes back to the step n2, that is, the next column item name "Mathematics" is displayed on the display unit 4'.

In case the count value cl reaches the left edge (cl=0), the process goes back to the step n2 without decreasing the count value cl by 1.

In case the read-in key is not the cursor left shift key 8b, the process goes to the step n10 and it is judged whether or not the read-in key is the search key 39'. In case the read-in key is not the search key 39', the process goes back to the step n2. In case the read-in key is the Search key 39', "search: ?" is displayed on the display unit 4' as shown in FIG. 25(1) in the step n11, subsequently the process goes to the search process shown in FIG. 27. As mentioned above, it means that in the flow chart in FIG. 26 any of the column items with respect to the data column shown in FIG. 22 can be selected and searched.

Figure 27A:
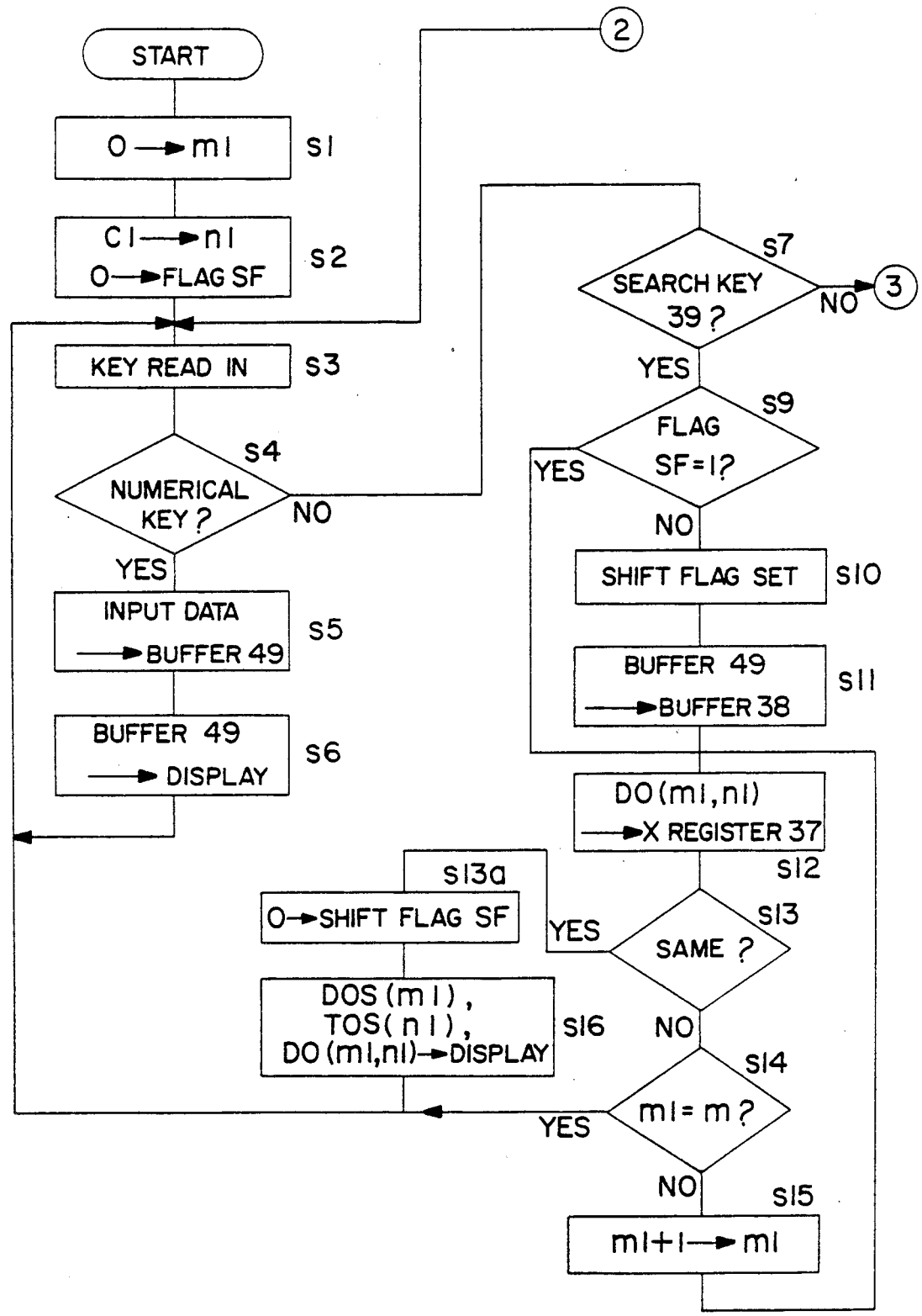
Figure 27B:
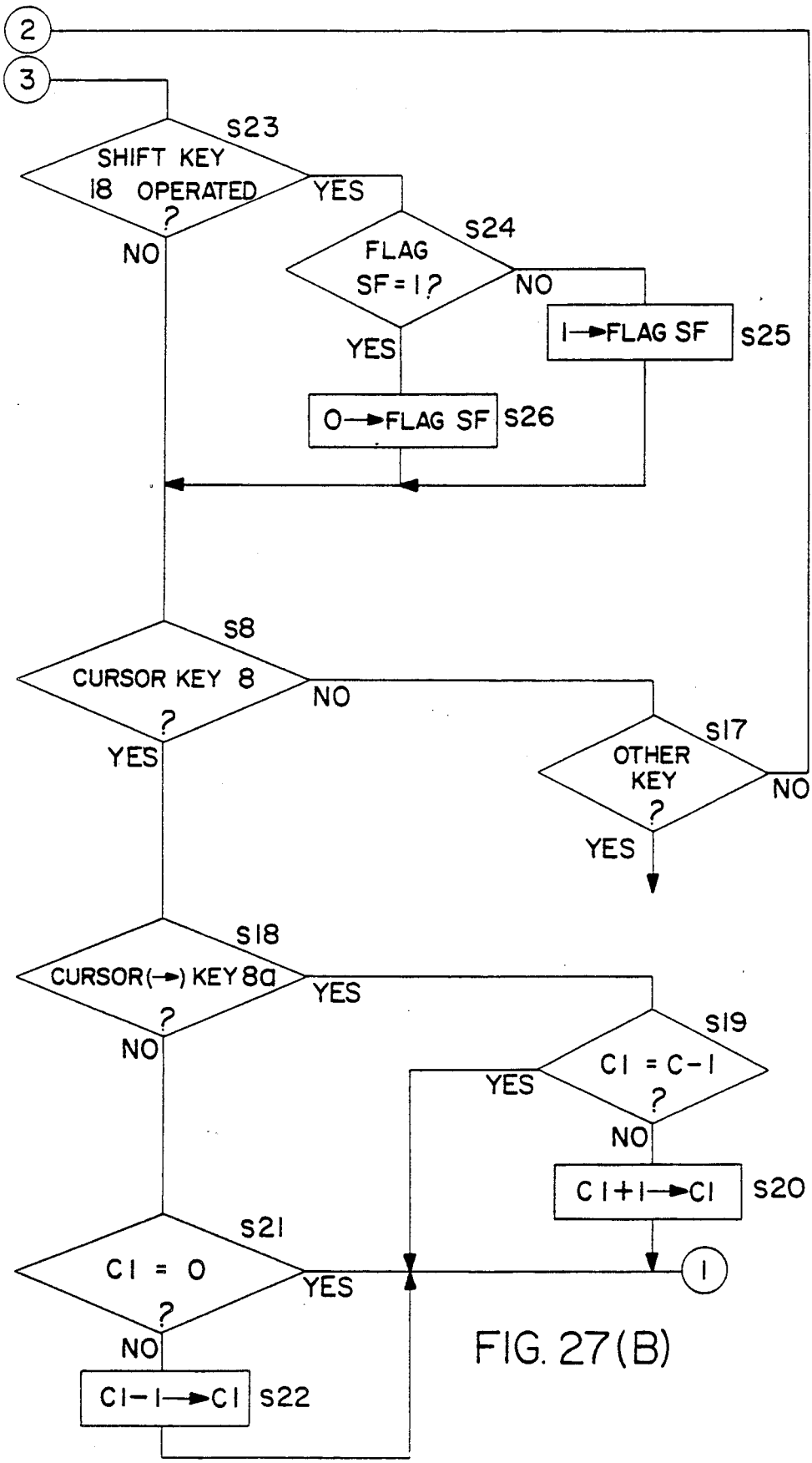

In FIGS. 27A and 27B, in the step S1 the count value ml of the m register 35, which is the parameter representing the column position of the data table in Table 2, is cleared so as to indicate the first row of the Table 2. In the step S2, the count value nl of the n register 36 is set to the count value cl which is the parameter showing the column item of the Table 1 set in the flow chart in FIG. 26 and the shift flag SF is set to 0. In the step S3 the key inputted in the key input portion 22 is read in.

In the step S4 it is judged whether or not the read-in key is one of the numerical keys group 6. In case the read-in key is a numerical key, the inputted numerical data is stored in the key input buffer 49 in the step S5 and the contents stored in the key input buffer 49 are displayed on the display unit 4 in the step S6. That is, when the data "35" is inputted by operating the numerical key 6, the display "search: 35_" is displayed on the display unit 4' as shown in FIG. 25(2).

In case the read-in key is not a numerical key in the step S4, the process goes to the step S7 and it is judged whether or not the read-in key is the search key 39'. In case the read-in key is not the search key 39', the process goes to the step S8, and in case the read-in key is the search key 39, the process goes to the step S9 and it is judged whether or not the shift flag SF is set at 1. Since the shift flag SF is set.at 0 in the step S2, the shift flag SF is set at 1 in the step S10 and in the step S11 the content of the key input buffer 49 is transferred to the comparison data storing buffer 38 of the first memory portion for searching. In the step S12 the table data DO(ml,nl) of Table 2 indicated by the count values ml and nl is taken out into the X register 37 of the second memory portion.

In the step S13' the contents stored in the X register 37 is compared with the contents stored in the buffer 38 and it is judged whether or not these two contents are same. In case the two kinds of contents are not same, it is judged in the step S14 whether or not the count value ml reaches the maximum row number m of the Table 2, in other words, does the searched row reach the end row of the Table 2. In case the count value ml does not reach the end row number m (ml=m), in the step S15 the count value ml is added by 1 and the process goes back to the step S12. In case the count value ml reaches the maximum row number m in the step S14' the process goes back to the step S3 without increasing the count value ml and the key is read-in.

In case the content stored in the X register 37 is same as the content stored in the buffer 38 in the step S13' the process goes to the step S13a and the shift flag SF is reset to 0. Subsequently, the process goes to the step S16 and the string functions Tφ$(ml) and Tφ$(nl) and the data Dφ(ml,nl) with respect to the count values ml and nl are displayed on the display unit 4. That is, the row item and column item and the data "Kato: Japanese=35" are displayed on the display unit 4 with respect to the reference value depending on the input data 35 with respect to the column item of "Japanese" in Table 1 as shown in FIG. 25(3).

In case the shift key 18' is operated and subsequently the search key 39' is operated in the step S3 after the search operation with respect to the input data 35 is automatically executed, the process jumps to the step S12 from the step S9 without processing steps S10 and S11. That is, when the search operation is executed in the above-mentioned step, the corresponding search operation is continued without changing the input data "38" sorted in the comparison data storing buffer 38. Therefore, the display "Numata: Japanese=35." is displayed in the display unit 4 as shown in FIG. 25(5).

In case the read-in key is not the search key 39, in the step S7, the process goes to the step S23 and it is judged whether or not the shift key 18' is operated, in other words, whether the search operation is continued or another operation is started. In case the shift key 18' is not operated in the step S23, the process goes to the step S8 and in case the shift key 18' operated, the process goes to the step S24. It is judged in the step S24 whether or not the shift flag SF is set at 1. In case the shift flag SF is set at 0, the shift flag SF is set to 1 in the step S25 and the process goes to the step S8. In case the shift flag SF is set to 1 the shift flag SF is set to 0 in the step S26 and the process goes to the step S8.

Next in the step S8 it is judged whether or not the read-in key is one of the cursor keys group 8'. In case the read-in key is not a cursor key, the process goes to the step S17, and in case the read-in key is a cursor key, the process goes to the step S18 and it is judged whether or not the read-in key is the cursor right shift key 81' of the cursor keys group 8'. In case the read-in key is the cursor right shift key 8a', it is judged in the step S19 whether or not the count value cl reaches the right edge of the Table 2 (cl=c−1). In case the count value cl does not reach the right edge of the Table 1, the count value cl is increased by 1 in the step S20 and the process goes back to the step S16. That is, even if the process is operation searching operation the column items as mentioned above, the display "Kato: Science=94." is displayed on the display unit 4' as shown in FIG. 25(4) by operating the cursor right shift key 8a'. In case the count value cl reaches the right edge of the Table 2 (cl=c−1) in the step S19, the count value cl is not added by 1 and the corresponding column item "Science" is remained to be indicated.

In case the read-in key is not the cursor right shift key 8' in the step S18, since it means that the cursor left shift key 8b' was pressed, it is judged in the step S21 whether or not the count value cl reaches the left edge of Table 2. In case the count value cl reaches the left edge of Table 2, the process goes back to the step S3 as it is. In case the count value cl does not reach the left edge of Table 2, the count value cl is decreased by 1 in the step S22 and the process goes back to the step S3.

In the present embodiment as mentioned above, in case the table data as shown in Table 2 is inputted, a search of such the data table can be executed basically along the column direction of the data table. Even after the first search operation is finished by operation the search key 39', in case the search operation is executed on the basis of the same input data, it is not necessary to input such data again and the search operation can be sequentially executed only by operating the shift key 18'.

As described above, in the data processing device according to the present invention, the data group with arrangement aspect of a matrix shape are stored in the memory means. On the other hand, the data for comparison is inputted by the input means and the inputted data is stored in the first memory portion. The data in the above-mentioned group is stored in turn in the second memory portion so as to be compared with the inputted data, and then the contents in the second memory portion are sequentially compared, whereby the data of the data group and the data inputted through the input means can be continuously compared. Therefore, the operability of such a data processing device can be remarkably improved.

The invention being thus described, it will be obvious that the same may be varied in many ways. Such variations are not to be regarded as a departure from the spirit and scope of the invention, and such modifications, as would be obvious to one skilled in the art, are intended to be included within the scope of the claims.

What is claimed is:

1. A statistic processing system in a portable minicomputer for performing a plurality of statistical functions, comprising:
   memory means for storing data in a table format formed of a plurality of rows and columns;
   input means for inputting each item of said data into a selected row and column of said memory means;
   designation means operatively communicating with said input means for designating a particular row and column for storing each item of said data in said memory means;
   second memory means for storing a plurality of statistical calculation functions;
   calculation means for selecting one of said plurality of statistical calculation functions by recalling the desired said function from said second memory means and the specific row or column containing the data to be used in said function and for performing said selected statistical calculation function, wherein said function can be performed on any collection of data contained in a row or column of said memory means; and
   single line display means for displaying said specific row or column selected by said calculation means.

2. A statistic processing system as recited in claim 1, wherein said calculation means further comprises:
   distribution calculation means in communication with said input means for calculating a statistical distribution using data stored in said memory means, wherein additional data necessary for performing said distribution calculation is inputted through said input means.

3. A statistical processing system as recited in claim 1, further comprising:
   search means for identifying a data, inputted through said input means, in said memory means.

4. A statistic processing system as recited in claim 1, further comprising missing value means in communication with said calculation means for setting a maximum or minimum value in the event a selected row and column does not contain data.

5. A statistic processing system as recited in claim 1, wherein said display means further comprises means for displaying a selected data stored in said memory, with a numerical designation representing the particular row and column at which the data is stored.

6. A statistic processing system as recited in claim 5, wherein said display means further comprises means for scrolling through said data stored in said memory means either by row or by column.

7. A statistic processing system for performing a plurality of statistical functions, comprising:
   data table memory means for storing a plurality of table formatted numerical data in a plurality of rows and columns and for storing a maximum or a minimum numerical data;
   missing value indicating means for indicating a missing data in said data table memory means by assigning a maximum or minimum data of said numerical data used in the system and for generating said maximum or minimum value as a data item in a data table format;
   statistical calculation means for reading out numerical data contained in a selected row and column of said data table memory means and for performing a statistical calculation on the data without consideration of the missing value; and
   display means for displaying data read from said data table memory means, wherein if the data is a missing value, the data is replaced with a symbol mark representing the missing value and the symbol mark is displayed in the display means with the results of said statistical calculation.

* * * * *